(12) United States Patent
Tibah

(10) Patent No.: US 11,866,940 B2
(45) Date of Patent: Jan. 9, 2024

(54) ROOFING SYSTEMS UTILIZING EMBEDDED DECORATIVE LAYER

(71) Applicant: BMIC, LLC, Dallas, TX (US)

(72) Inventor: Denis M. Tibah, Waxahachie, TX (US)

(73) Assignee: BMIC LLC, Dallas, TX (US)

( * ) Notice: Subject to any disclaimer, the term of this patent is extended or adjusted under 35 U.S.C. 154(b) by 11 days.

(21) Appl. No.: 17/668,049

(22) Filed: Feb. 9, 2022

(65) Prior Publication Data

US 2022/0251842 A1    Aug. 11, 2022

Related U.S. Application Data

(60) Provisional application No. 63/147,863, filed on Feb. 10, 2021.

(51) Int. Cl.
*E04D 1/30* (2006.01)
*B32B 27/30* (2006.01)
(Continued)

(52) U.S. Cl.
CPC ............... *E04D 1/30* (2013.01); *B32B 5/022* (2013.01); *B32B 5/024* (2013.01); *B32B 27/12* (2013.01); *B32B 27/304* (2013.01); *B32B 27/306* (2013.01); *B32B 27/308* (2013.01); *B32B 27/32* (2013.01); *B32B 27/365* (2013.01); *B32B 27/40* (2013.01); *E04D 1/22* (2013.01);
(Continued)

(58) Field of Classification Search
CPC ....... B32B 2255/02; B32B 3/30; B32B 27/20; B32B 27/283; B32B 2307/4026; B32B 5/26; B32B 5/262; B32B 2255/26; B32B 2307/558; B32B 5/028; B32B 5/02; B32B 7/08; B32B 7/12; B32B 9/047; B32B 27/302; E04D 1/26
See application file for complete search history.

(56) References Cited

U.S. PATENT DOCUMENTS 3,434,259 A    3/1969  Corbin
4,021,981 A    5/1977  Van Wagoner
(Continued)

FOREIGN PATENT DOCUMENTS

CA    2530192 C    2/2012
CA    3053632 A1   8/2018
(Continued)

OTHER PUBLICATIONS

Katerra; Light Timber Structural Components-Brochure; katerra.com; available as of the filing date of the present application.
(Continued)

*Primary Examiner* — Elmito Breval
(74) *Attorney, Agent, or Firm* — Womble Bond Dickinson (US) LLP

(57) ABSTRACT

A roof system for forming a roof includes a first layer positioned over a substrate, the first layer including a translucent material adapted to be exposed to weather, and a second layer positioned between the first layer and the substrate. The second layer is a decorative layer with decorative features such as, for example, an image, design, color, pattern, picture, fabric, or combinations thereof. The decorative features of the second layer are visible through the first layer.

21 Claims, 9 Drawing Sheets

(51) Int. Cl.

| | | |
|---|---|---|
| *B32B 27/36* | (2006.01) | |
| *B32B 27/40* | (2006.01) | |
| *B32B 5/02* | (2006.01) | |
| *B32B 27/12* | (2006.01) | |
| *F21V 33/00* | (2006.01) | |
| *E04D 1/22* | (2006.01) | |
| *E04D 1/28* | (2006.01) | |
| *E04D 5/10* | (2006.01) | |
| *B32B 27/32* | (2006.01) | |

(52) U.S. Cl.
CPC ............... *E04D 1/28* (2013.01); *E04D 5/10* (2013.01); *F21V 33/006* (2013.01); *B32B 2307/3065* (2013.01); *B32B 2307/414* (2013.01); *B32B 2307/71* (2013.01); *B32B 2307/7246* (2013.01); *B32B 2307/7265* (2013.01); *B32B 2419/06* (2013.01); *E04D 2001/308* (2013.01)

(56) References Cited

U.S. PATENT DOCUMENTS

| | | |
|---|---|---|
| 4,464,215 A | 8/1984 | Coglino |
| 4,668,315 A | 5/1987 | Brady et al. |
| 4,735,838 A | 4/1988 | Roberts et al. |
| 4,775,567 A | 10/1988 | Harkness |
| 5,671,577 A | 9/1997 | Todd |
| 5,693,133 A | 12/1997 | Largent et al. |
| 6,990,779 B2 | 1/2006 | Kiik et al. |
| 7,272,915 B2 | 9/2007 | Peng |
| 7,285,183 B2 | 10/2007 | Kajander et al. |
| 7,765,763 B2 | 8/2010 | Teng et al. |
| 7,803,239 B2 | 9/2010 | Scheirer et al. |
| 7,984,591 B2 | 7/2011 | Cashin et al. |
| 8,079,184 B2 | 12/2011 | Wiercinski et al. |
| 8,158,450 B1 | 4/2012 | Sheats et al. |
| 8,171,689 B2 | 5/2012 | Pierson et al. |
| 8,206,539 B2 | 6/2012 | Kalkanoglu |
| 8,215,083 B2 | 7/2012 | Toas et al. |
| 8,309,211 B2 | 11/2012 | Mehta et al. |
| 8,323,770 B2 | 12/2012 | Mehta et al. |
| 8,426,017 B2 | 4/2013 | Paradis et al. |
| 8,470,436 B1 | 6/2013 | Paradis et al. |
| 8,590,267 B2 | 11/2013 | Jaffee |
| 8,673,427 B2 | 3/2014 | Kalkanoglu et al. |
| 8,689,510 B1 | 4/2014 | Krumvieda |
| 8,713,882 B2 | 5/2014 | Kalkanoglu et al. |
| 8,863,442 B2 | 10/2014 | Freeman |
| 8,869,478 B2 | 10/2014 | Gianolio |
| 9,032,679 B2 | 5/2015 | Propst |
| 9,334,655 B2 | 5/2016 | Polumbus et al. |
| 9,404,261 B2 | 8/2016 | Johnson et al. |
| 9,512,342 B1 | 12/2016 | Gutman |
| 9,534,378 B2 | 1/2017 | Humphreys et al. |
| 9,551,152 B2 | 1/2017 | Feuer et al. |
| 9,611,647 B2 | 4/2017 | Yang |
| 9,636,892 B2 | 5/2017 | Albert et al. |
| 9,783,995 B2 | 10/2017 | Meersseman et al. |
| 9,840,851 B2 | 12/2017 | Propst |
| 9,890,537 B2 | 2/2018 | Martin et al. |
| 9,963,880 B2 | 5/2018 | Kraus et al. |
| 9,982,437 B2 | 5/2018 | Barrego |
| 10,087,634 B2 | 10/2018 | Johnson et al. |
| 10,240,338 B2 | 3/2019 | Durst et al. |
| 10,253,502 B2 | 4/2019 | Grube et al. |
| 10,259,199 B2 | 4/2019 | Beuchel et al. |
| 10,415,245 B2 | 9/2019 | Bennett et al. |
| 11,028,590 B1 | 6/2021 | Boss et al. |
| 2002/0189185 A1 | 12/2002 | Hunter, Jr. |
| 2004/0055240 A1 | 3/2004 | Kiik et al. |
| 2004/0172908 A1 | 9/2004 | Swann |
| 2004/0209032 A1 | 10/2004 | Wani et al. |
| 2005/0170720 A1 | 8/2005 | Christiansen et al. |
| 2005/0210808 A1 | 9/2005 | Larson et al. |
| 2006/0059833 A1 | 3/2006 | Pelzer et al. |
| 2006/0096213 A1 | 5/2006 | Griffin et al. |
| 2006/0141191 A1 | 6/2006 | Seth et al. |
| 2006/0193995 A1 | 8/2006 | Yong |
| 2006/0275561 A1 | 12/2006 | Agrawal |
| 2007/0193167 A1 | 8/2007 | Bruce et al. |
| 2008/0008858 A1 | 1/2008 | Hong et al. |
| 2008/0029210 A1 | 2/2008 | Swei et al. |
| 2008/0081152 A1 | 4/2008 | Khan et al. |
| 2008/0209835 A1 | 9/2008 | Margarites |
| 2009/0013620 A1 | 1/2009 | West |
| 2011/0173908 A1 | 7/2011 | Kahle |
| 2011/0185651 A1 | 8/2011 | Taylor |
| 2011/0197543 A1 | 8/2011 | Lee et al. |
| 2011/0223410 A1 | 9/2011 | Gencer et al. |
| 2013/0034721 A1 | 2/2013 | Wang et al. |
| 2013/0217318 A1 | 8/2013 | Edwards et al. |
| 2014/0072751 A1 | 3/2014 | Bradenburg |
| 2014/0259972 A1 | 9/2014 | Feuer et al. |
| 2015/0144250 A1 | 5/2015 | Subotic et al. |
| 2015/0240495 A1 | 8/2015 | Vermilion et al. |
| 2015/0361299 A1 | 12/2015 | Byrne et al. |
| 2017/0002231 A1 | 1/2017 | Haberle et al. |
| 2017/0326836 A1 | 11/2017 | Wilde et al. |
| 2018/0015688 A1 | 1/2018 | Park et al. |
| 2018/0283026 A1 | 10/2018 | Mathieson |
| 2019/0292789 A1 | 9/2019 | Mallick et al. |
| 2020/0149288 A1 | 5/2020 | Griechen et al. |
| 2021/0095467 A1 | 4/2021 | Zheng et al. |
| 2021/0095473 A1 | 4/2021 | Zheng et al. |
| 2021/0379876 A1 | 12/2021 | Boss et al. |

FOREIGN PATENT DOCUMENTS

| | | | |
|---|---|---|---|
| CA | 3021182 A1 | | 4/2019 |
| CN | 108149849 A | | 6/2018 |
| EP | 2871053 A1 | | 5/2015 |
| FR | 2569218 A1 | | 2/1986 |
| JP | 2004251102 A | | 9/2004 |
| JP | 2006-328104 A | | 12/2006 |
| JP | 2020157491 A | * | 10/2020 |
| KR | 100785333 B1 | | 12/2007 |
| KR | 20090087979 A | | 8/2009 |
| WO | WO2012/162845 A1 | | 12/2012 |
| WO | WO2018/023147 A1 | | 2/2018 |
| WO | WO2018/154427 A1 | | 8/2018 |

OTHER PUBLICATIONS

Katerra; Katerra CLT Product Definition; Technical Specifications Booklet; clt@katerra.com/katerra.com/ctl; updated May 2021.
KATERRA: Building Platforms—Brochure; 2019.
Youtube: "How to Install TPO/PVC Coating I GAF Roof Mate"; https://www.youtube.com/watch?v=utrSOcyr-ol; dated Mar. 20, 2019.

* cited by examiner

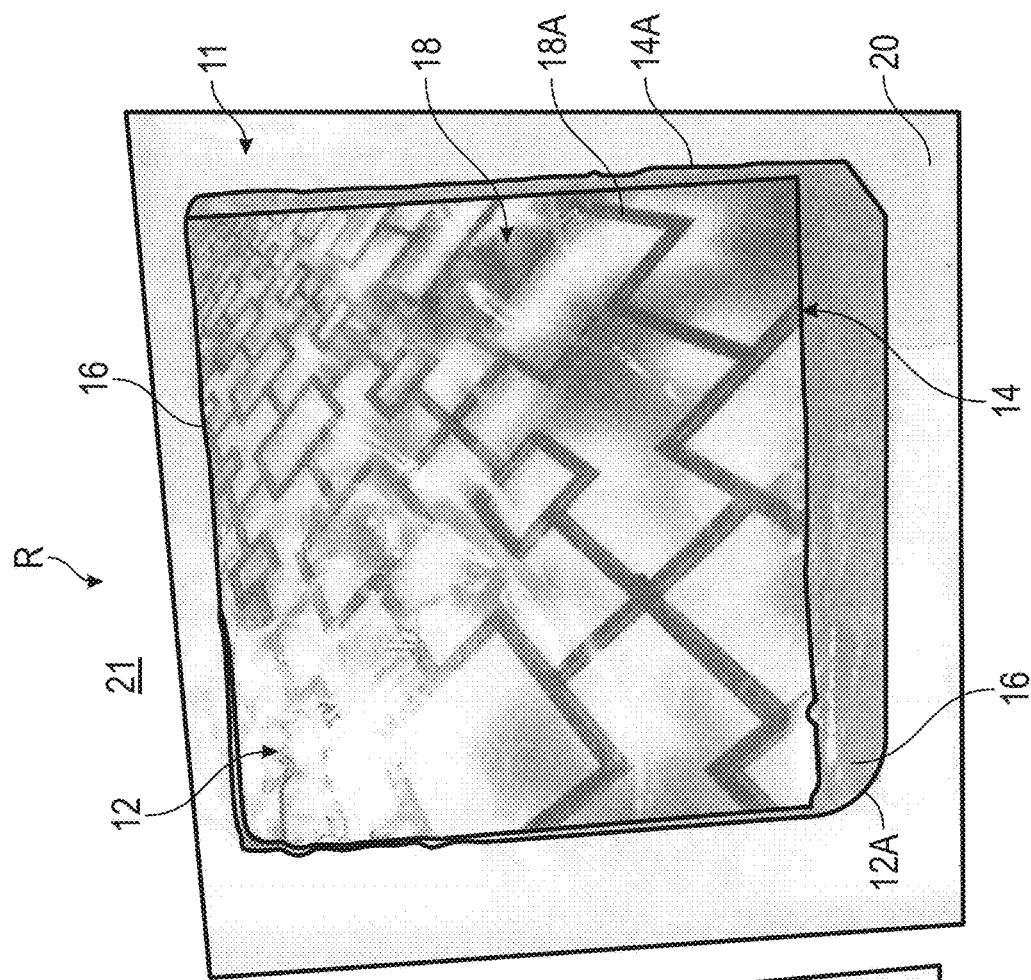
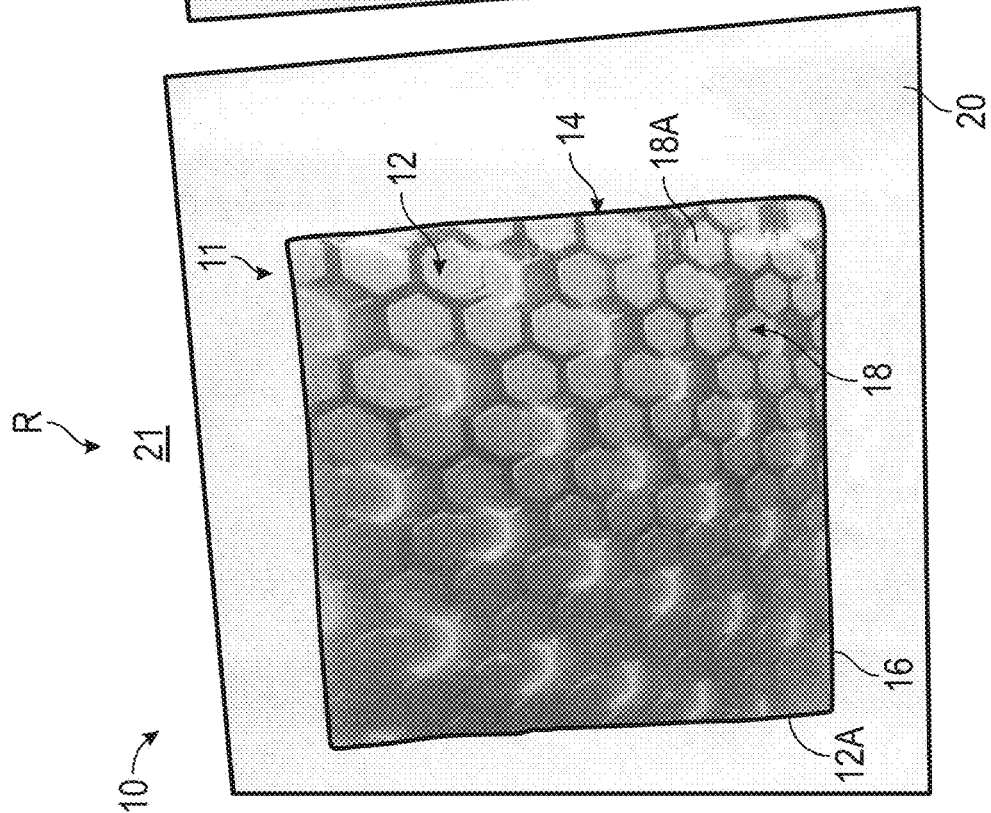
FIG. 5B
FIG. 5A

ROOFING SYSTEMS UTILIZING EMBEDDED DECORATIVE LAYER

CROSS-REFERENCE TO RELATED APPLICATION

The present application claims benefit of U.S. Provisional Patent Application No. 63/147,863, filed Feb. 10, 2021.

INCORPORATED BY REFERENCE

The disclosure of U.S. Provisional Patent Application No. 63/147,863, filed Feb. 10, 2021, is incorporated by reference herein for all purposes as if set forth in its entirety.

TECHNICAL FIELD

This disclosure relates generally to roofing systems and in particular to roofing systems utilizing a decorative layer.

BACKGROUND

Roofing materials, e.g., shingles, roofing membranes, roofing tiles, etc., sometimes use granules, aggregate materials, or colorants in a capping/weathering layer. However, such conventional capping materials generally do not allow for much versatility for providing a wide variety of patterns appearances, such as multivariate image patterning. In addition, metal roofing systems typically use capping paints to improve aesthetics, which also can provide for generally limited image design options. It can be expensive to achieve significant image patterning, including customizable patterns for such existing capping materials.

Accordingly, it can be seen that needs exist for roof systems that can provide for greater variety of multivariate image, color patterning and designs, including customizable patterns and designs, for roofing and outdoor systems, the present disclosure addresses these and other related and unrelated issues.

SUMMARY

Briefly described, according to one aspect, a roof system includes a substrate and a translucent layer positioned over the substrate that reveals a plurality of decorative features. In one non-limiting embodiment, the roof system includes a first layer positioned over the substrate and comprising a translucent material adapted to be exposed to weather (e.g. wind, rain, snow, heat, cold, sunlight (including ultraviolet (UV) light, visible light, infrared (IR) light), hail and other impacts, etc. . . . ), and a second layer positioned between the first layer and the substrate. The second layer is a decorative layer with decorative features including, but not limited to, an image, design, color, pattern, picture, fabric, or combinations thereof that are visible through the first layer. In some non-limiting example embodiments, the roof system includes a translucent layer positioned over the substrate, and the translucent layer can include a decorative layer or decorative features integrated therewith. For example, the translucent layer can comprise a polymer material and has decorative features embedded, embossed, or otherwise integrated therewith, and that are visible through the translucent layer.

In embodiments of the roof system, a decorative layer can be positioned beneath a translucent layer that is adapted to be exposed to weather, and forms a weathering or capping layer for the roof system. In some embodiments, a decorative layer can be a coated substrate having a protective coating such as a UV resistant coating. In one embodiment of the roof system, the decorative layer can be a base material which is further coated with a UV resistant translucent coating material or capped with separate translucent roofing material, during production or during installation. Embodiments of the present disclosure can provide for multivariate image, color patterning and design, that can provide ease of installation such as by being capable of being rolled out over a roof deck, or applied as one or more individual sheets, panels, or as roofing shingles without generating significant additional cost for roofing and outdoor systems.

Various aspects of a roofing system including a translucent layer and a decorative layer and/or decorative features that are visible through the translucent layer include, without limitation a roof system, comprising a substrate; a first layer positioned over the substrate, the first layer comprising a UV resistant translucent material adapted to be exposed to weather including varying environmental conditions such as, wind, rain, snow, temperature variations, sunlight (including UV light, visible light, IR light), hail or other impacts, etc., over time; a second layer between the first layer and the substrate, the second layer comprising a UV resistant decorative layer including an image, design, color, pattern, picture, fabric, or combinations thereof; and a protective layer applied along the second layer; wherein the decorative layer is visible through the first layer.

In embodiments of the roof system, the first layer comprises a sheet or film of polypropylene, polyethylene, polyacrylate, polycarbonate, ethylene-vinyl acetate, silicone, polyvinyl fluoride, polyvinyl chloride, polyurethane, polyvinylidene fluoride, fluorinated ethylene propylene, or combinations thereof.

In embodiments of the roof system, the decorative layer is integrated with the first layer and further comprises an extruded, woven, textured, embossed or patterned mat, fabric or sheet or combination thereof.

In embodiments, the second layer further comprises a plurality of lights arranged along a lower surface of the second layer and configured to project at least one image, color, design, pattern, or combinations thereof, through the second layer so as to visible through the first layer.

In embodiments, the roof system further comprises a waterproof layer positioned along the substrate and over which the first and second layers are received.

In embodiments, the roof system further comprises a vapor barrier applied to the substrate.

In embodiments, the protective layer comprises a film, sheet or coating applied to a bottom surface of the second layer; and in some embodiments, the protective layer comprises a waterproof membrane.

In embodiments, the translucent material of the first layer further comprises a fire resistant material, an ultraviolet resistant material, impact resistant material, an antioxidant material, or combinations thereof.

According to another aspect, a method, comprises moving a sheet of translucent polymer material along a processing path; applying a decorative layer to at least one side surface of the sheet of translucent polymer material, wherein the decorative layer comprises an image, pattern, design, color, picture, textured appearance, or combinations thereof; applying a protective layer to the decorative layer opposite the at least one side surface of the sheet of translucent polymer material, the decorative layer comprising a UV resistant material; and forming a plurality of roofing shingles from the sheet of translucent polymer material; wherein the roofing shingles each include an upper surface adapted to be exposed to weather, and wherein the image, pattern, design, color photograph, textured appearance, or combinations thereof of the decorative layer is visible through the upper surface of each roofing shingle.

In embodiments, applying the decorative layer to the sheet of translucent polymer material comprises printing, painting, etching, laminating, adhering, embedding, or embossing the image, pattern, design, color, picture, textured appearance, or combination thereof along the at least one side surface of the sheet of translucent polymer material.

In embodiments of the method, the sheet of translucent polymer material comprises an extruded, woven, printed, colored, textured, or patterned mat, fabric, or sheet, or combination thereof.

In some embodiments, the method further comprises positioning a plurality of lights along the decorative layer; wherein the lights of the plurality of lights are selectively controllable to create an image, design, picture, video, color, pattern, or combination thereof, that is displayed through the upper surface of the sheet of translucent polymer material. In embodiments, inverse images, pictures, videos or other designs can be projected onto the translucent layer and will be visible therethrough.

In embodiments, the method further comprises positioning a plurality of solar cells along the decorative layer.

According to a further aspect, a roof system comprises: a substrate; a translucent layer configured to be mounted along the substrate; a decorative layer applied to the translucent layer and including at least one image, design, pattern, picture, textured appearance, color, or combinations thereof; a protective layer along the decorative layer; and a waterproofing layer positioned between the substrate and the translucent layer; wherein the decorative layer comprises a UV resistant material is visible through the translucent layer after the translucent layer is mounted to the substrate.

In embodiments of the roof system, the translucent layer further comprises an extruded, woven, textured, embossed or patterned mat, fabric or sheet.

In embodiments of the roof system, the decorative layer is applied to the translucent layer by embedding, embossing, adhering, etching, painting, dyeing, laminating, printing, or combination thereof.

In embodiments of the roof system, the translucent layer comprises a sheet or film of polypropylene, polyethylene, polyacrylate, polycarbonate, ethylene-vinyl acetate, silicone, polyvinyl fluoride, polyvinyl chloride, polyurethane, polyvinylidene fluoride, fluorinated ethylene propylene, or combination thereof.

In embodiments of the roof system, the translucent layer further comprises a fire resistant material, an ultraviolet resistant material, impact resistant material, an antioxidant material, or combination thereof.

In embodiments, the roof system further comprises a vapor barrier applied to the substrate and configured to provide transmission of water vapor therethrough.

In other aspects, a roof system comprises: a substrate; a translucent layer positioned over the substrate, the translucent layer comprising a polymer material and having a decorative features integrated therewith; wherein the decorative features comprise a color, an image, picture, texture, pattern, or combinations thereof, and are visible through the translucent layer; and a protective layer applied to a lower surface of the translucent layer, the protective layer comprising a polymer sheet and configured to be removable from the translucent layer.

In some embodiments, the decorative features comprise one or more particles, chips, dyes, tinting materials or combination thereof, mixed with the polymer material of the translucent layer prior to formation of translucent layer.

In embodiments, the roof system further comprises a waterproof layer applied to the substrate and over which the translucent layer is positioned, and a vapor barrier layer positioned below the substrate.

In embodiments, the roof system further comprises an adhesive material applied to the lower surface of the translucent layer, and wherein the protective layer is removed to expose the adhesive material prior to the positioning of the translucent layer over the substrate.

In some embodiments, the roof system the decorative features comprise a woven or non-woven fabric or mat, chips, particles, picture, image, textured appearance or combinations thereof printed, painted, etched, laminated, adhered, embedded or embossed into the lower surface of the translucent layer.

Accordingly, embodiments of roofing materials, roofing systems and methods for forming roofing materials that are directed to the above discussed and other aspects are disclosed. The foregoing and other advantages and aspects of the embodiments of the present disclosure will become apparent and more readily appreciated from the following detailed description and the claims, taken in conjunction with the accompanying drawings. Moreover, it is to be understood that both the foregoing summary of the disclosure and the following detailed description are exemplary and intended to provide further explanation without limiting the scope of the present disclosure.

BRIEF DESCRIPTION OF THE DRAWINGS

The accompanying drawings, which are included to provide a further understanding of the embodiments of the present disclosure, are incorporated in and constitute a part of this specification, illustrate embodiments of this disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

FIGS. 5a-5b show example roofing materials according to additional aspects of the present disclosure.

DETAILED DESCRIPTION

The embodiments of the present disclosure will now be described in more detail with reference to the attached drawing figures.

FIGS. 1-11 show embodiments of a roof system 10 according to the present disclosure. The roof system 10 (FIGS. 1-3) comprises a roofing material 11 that may comprise virtually any roofing material including, but not limited to, roofing shingles, a roofing membrane, and roofing tiles to name a few. The roofing material 11 is configured to be positioned over a roof deck R of a roof, such as by being applied or otherwise placed onto an upper surface of the roof deck, and can be secured by adhesives or sealant materials, fasteners, connectors, other attachments, or combinations thereof. The roof system further is adopted to present a decorative appearance, including multivariate images, color patterning, designs, including customized or customer selectable patterns, designs, decorative feature or combinations thereof.

Figure 1:
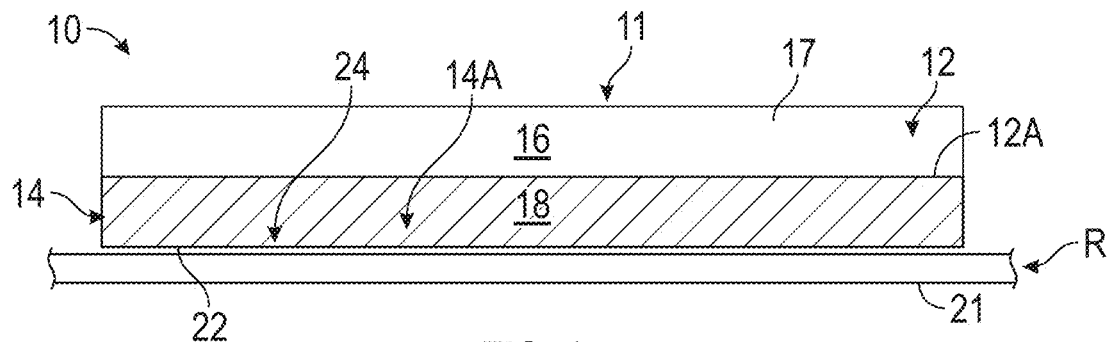
FIG. 1 shows a cross-sectional view of a roofing material of a roof system according to one embodiment.
Figure 2:
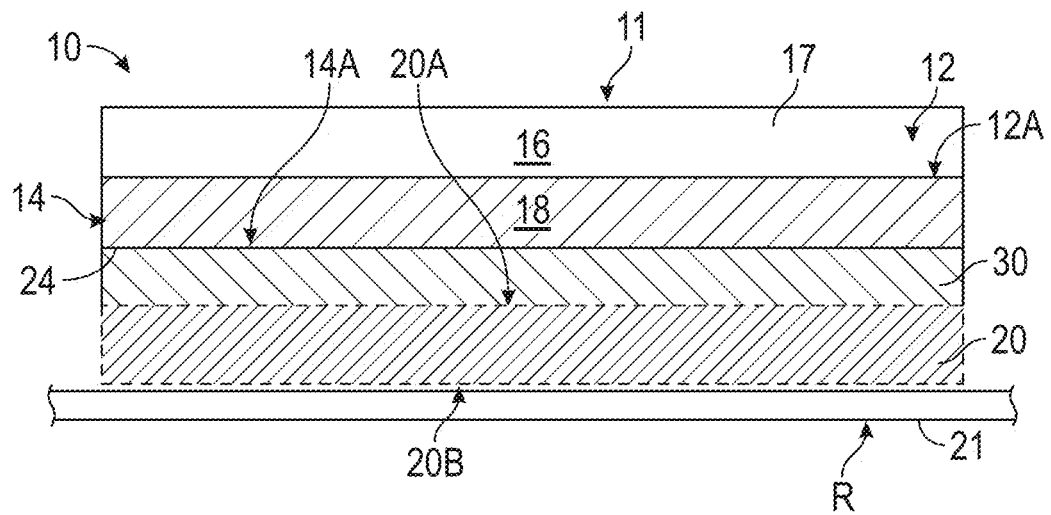
FIG. 2 shows a cross-sectional view of a roofing material of a roof system according to another embodiment.
Figure 3:
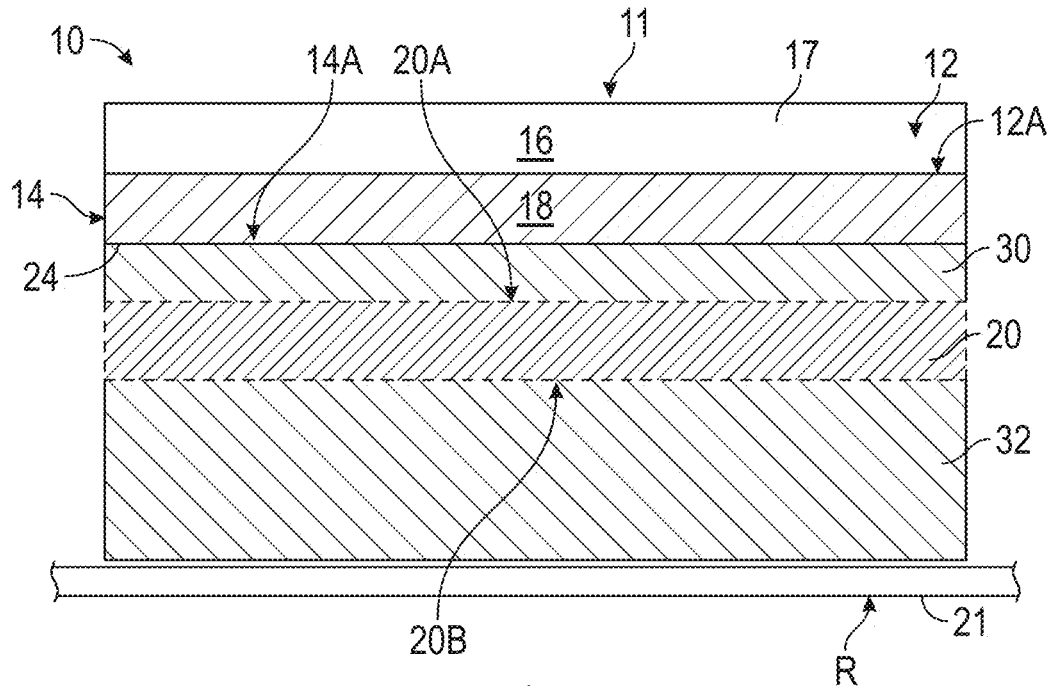
FIG. 3 shows a cross-sectional view of a roofing material of a roof system according to yet another embodiment.

As indicated in FIGS. 1-3, the roofing material 11 of the roof system 10 generally includes a first layer or region 12 and a second layer or region 14. In embodiments, the first layer 12 comprises a translucent layer 16 comprising a translucent material 17 that is adapted to be exposed to weather or other external elements, for example, including, but not limited to an ability to withstand exposure to environmental conditions such as exposure to wind, sunlight (including UV light, visible light and IR light), rain, snow, temperature variations (e.g. extreme cold and extreme heat), impacts from hail or other objects. The second layer 14 comprises a decorative layer 18 including decorative features or portions 18A including an image, design, color, pattern, picture, fabric, or combinations thereof. The second layer 14 or decorative layer will be covered and protected by the first, translucent layer with the decorative features 18A of the decorative layer visible through the translucent layer 16 that forms the first layer 12. In embodiments, as shown in FIGS. 4a-10c, the decorative features 18A can include colored particles arranged into an image(s) or a geometric or random pattern(s); a material(s) capable of transitioning color when viewed from different angles; light projected image(s), including inverse images, videos, pictures, designs and combinations thereof; minimal heat generating light sources; active or dummy solar cells; a material(s) matching a solar panel color; or a construction material(s) (e.g., drywall, wallpaper, tile, plywood, glass, roofing membrane, etc.); or combinations thereof.

The translucent layer 12 (FIGS. 1-3) can comprise a sheet or film, or in some embodiments, a coating, of a durable waterproof material, e.g. a material that provides resistance to passage of water therethrough and water shedding properties, facilitating flowing of water along the roofing material to deter ponding or pooling of water thereon. By way of example, and not limitation, in embodiments, the translucent layer can comprise polypropylene, polyethylene, polyacrylate, polycarbonate, ethylene-vinyl acetate, silicone, polyvinyl fluoride, polyvinyl chloride, polyurethane, polyvinylidene fluoride, fluorinated ethylene propylene, or combinations thereof. In addition, or in the alternative, the translucent material 17 of the first, translucent layer 12 can comprise a fire resistant material, an ultraviolet resistant material, impact resistant material, an antioxidant material, or combinations thereof.

In some embodiments, the translucent layer 16 can have a thickness of 25 mils to 250 mils, although other, greater or lesser thicknesses also can be used. For example, but without limitation, in embodiments, the translucent layer can have a thickness of 10 mils to 500 mils, 10 mils to 400 mils, 10 mils to 300 mils, 10 mils to 250 mils, 10 mils to 200 mils, 10 mils to 150 mils, 10 mils to 100 mils, 10 mils to 75 mils, 10 mils to 50 mils, 10 mils to 25 mils, 25 mils to 50 mils, 25 mils to 75 mils, 25 mils to 100 mils, 25 mils to 150 mils, 25 mils to 200 mils, 25 mils to 250 mils, 25 mils to 300 mils, 25 mils to 350 mils, 25 mils to 400 mils, 25 mils to 450 mils, and/or 25 mils to 500 mils.

In embodiments, the translucent layer, will exhibit a UV resistance including resistance to loss of gloss, cracking, peeling, chalking, or loss of strength due to exposure to full spectrum sunlight (e.g., UV light, visible light and infrared (IR) light), and extreme cold and elevated temperatures (e.g. temperatures below 0° F. and above 100° F.). The translucent layer also can have an impact resistance (e.g. an ability to withstand an impact of 4.09 to 29.5 ft-lb/in$^2$ according to ASTMD2794, ASTM D5628, and/or ASTM D6110.

In some embodiments, the translucent layer can have an impact resistance of 4.0 to 30.0 ft-lb/in$^2$, 4.0 to 29.0 ft-lb/in$^2$, 4.0 to 28 ft-lb/in$^2$, 4.0 to 27.0 ft-lb/in$^2$, 4.0 to 26.0 ft-lb/in$^2$, 4.0 to 25.0 ft-lb/in$^2$, 4.0 to 24.0 ft-lb/in$^2$, 4.0 to 23.0 ft-lb/in$^2$, 4.0 to 22.0 ft-lb/in$^2$, 4.0 to 21.0 ft-lb/in$^2$, 4.0 to 20.0 ft-lb/in$^2$, 4.0 to 19.0 ft-lb/in$^2$, 4.0 to 18.0 ft-lb/in$^2$, 4.0 to 17.0 ft-lb/in$^2$, 4.0 to 16.0 ft-lb/in$^2$, 4.0 to 15.0 ft-lb/in$^2$, 4.0 to 14.0 ft-lb/in$^2$, 4.0 to 13.0 ft-lb/in$^2$, 4.0 to 12.0 ft-lb/in$^2$, 4.0 to 11.0 ft-lb/in$^2$, 4.0 to 10.0 ft-lb/in$^2$, 4.0 to 9.0 ft-lb/in$^2$, 4.0 to 8.0 ft-lb/in$^2$, 4.0 to 7.0 ft-lb/in$^2$, 4.0 to 6.0 ft-lb/in$^2$, 4.0 to 5.0 ft-lb/in$^2$, 5.0 to 30.0 ft-lb/in$^2$, 5.0 to 29.0 ft-lb/in$^2$, 5.0 to 28.0 ft-lb/in$^2$, 5.0 to 27.0 ft-lb/in$^2$, 5.0 to 26.0 ft-lb/in$^2$, 5.0 to 25.0 ft-lb/in$^2$, 5.0 to 24.0 ft-lb/in$^2$, 5.0 to 23.0 ft-lb/in$^2$, 5.0 to 22.0 ft-lb/in$^2$, 5.0 to 21.0 ft-lb/in$^2$, 5.0 to 20.0 ft-lb/in$^2$, 5.0 to 19.0 ft-lb/in$^2$, 5.0 to 18.0 ft-lb/in$^2$, 5.0 to 17.0 ft-lb/in$^2$, 5.0 to 16.0 ft-lb/in$^2$, 5.0 to 15.0 ft-lb/in$^2$, 5.0 to 14.0 ft-lb/in$^2$, 5.0 to 13.0 ft-lb/in$^2$, 5.0 to 12.0 ft-lb/in$^2$, 5.0 to 11.0 ft-lb/in$^2$, 5.0 to 10.0 ft-lb/in$^2$, 5.0 to 9.0 ft-lb/in$^2$, 5.0 to 8.0 ft-lb/in$^2$, 5.0 to 7.0 ft-lb/in$^2$, 5.0 to 6.0 ft-lb/in$^2$, 6.0 to 30.0 ft-lb/in$^2$, 6.0 to 29.0 ft-lb/in$^2$, 6.0 to 28.0 ft-lb/in$^2$, 6.0 to 27.0 ft-lb/in$^2$, 6.0 to 26.0 ft-lb/in$^2$, 6.0 to 25.0 ft-lb/in$^2$, 6.0 to 24.0 ft-lb/in$^2$, 6.0 to 23.0 ft-lb/in$^2$, 6.0 to 22.0 ft-lb/in$^2$, 6.0 to 21.0 ft-lb/in$^2$, 6.0 to 20.0 ft-lb/in$^2$, 6.0 to 19.0 ft-lb/in$^2$, 6.0 to 18.0 ft-lb/in$^2$, 6.0 to 17.0 ft-lb/in$^2$, 6.0 to 16.0 ft-lb/in$^2$, 6.0 to 15.0 ft-lb/in$^2$, 6.0 to 14.0 ft-lb/in$^2$, 6.0 to 13.0 ft-lb/in$^2$, 6.0 to 12.0 ft-lb/in$^2$, 6.0 to 11.0 ft-lb/in$^2$, 6.0 to 10.0 ft-lb/in$^2$, 6.0 to 9.0 ft-lb/in$^2$, 6.0 to 8.0 ft-lb/in$^2$, 6.0 to 7.0 ft-lb/in$^2$, 7.0 to 30.0 ft-lb/in$^2$, 7.0 to 29.0 ft-lb/in$^2$, 7.0 to 28.0 ft-lb/in$^2$, 7.0 to 27.0 ft-lb/in$^2$, 7.0 to 26.0 ft-lb/in$^2$, 7.0 to 25.0 ft-lb/in$^2$, 7.0 to 24.0 ft-lb/in$^2$, 7.0 to 23.0 ft-lb/in$^2$, 7.0 to 22.0 ft-lb/in$^2$, 7.0 to 21.0 ft-lb/in$^2$, 7.0 to 20.0 ft-lb/in$^2$, 7.0 to 19.0 ft-lb/in$^2$, 7.0 to 18.0 ft-lb/in$^2$, 7.0 to 17.0 ft-lb/in$^2$, 7.0 to 16.0 ft-lb/in$^2$, 7.0 to 15.0 ft-lb/in$^2$, 7.0 to 14.0 ft-lb/in$^2$, 7.0 to 13.0 ft-lb/in$^2$, 7.0 to 12.0 ft-lb/in$^2$, 7.0 to 11.0 ft-lb/in$^2$, 7.0 to 10.0 ft-lb/in$^2$, 7.0 to 9.0 ft-lb/in$^2$, 7.0 to 8.0 ft-lb/in$^2$, 8.0 to 30.0 ft-lb/in$^2$, 8.0 to 29.0 ft-lb/in$^2$, 8.0 to 28.0 ft-lb/in$^2$, 8.0 to 27.0 ft-lb/in$^2$, 8.0 to 26.0 ft-lb/in$^2$, 8.0 to 25.0 ft-lb/in$^2$, 8.0 to 24.0 ft-lb/in$^2$, 8.0 to 23.0 ft-lb/in$^2$, 8.0 to 22.0 ft-lb/in$^2$, 8.0 to 21.0 ft-lb/in$^2$, 8.0 to 20.0 ft-lb/in$^2$, 8.0 to 19.0 ft-lb/in$^2$, 8.0 to 18.0 ft-lb/in$^2$, 8.0 to 17.0 ft-lb/in$^2$, 8.0 to 16.0 ft-lb/in$^2$, 8.0 to 15.0 ft-lb/in$^2$, 8.0 to 14.0 ft-lb/in$^2$, 8.0 to 13.0 ft-lb/in$^2$, 8.0 to 12.0 ft-lb/in$^2$, 8.0 to 11.0 ft-lb/in$^2$, 8.0 to 10.0 ft-lb/in$^2$, 8.0 to 9.0 ft-lb/in$^2$, 9.0 to 30.0 ft-lb/in$^2$, 9.0 to 29.0 ft-lb/in$^2$, 9.0 to 28.0 ft-lb/in$^2$, 9.0 to 27.0 ft-lb/in$^2$, 9.0 to 26.0 ft-lb/in$^2$, 9.0 to 25.0 ft-lb/in$^2$, 9.0 to 24.0 ft-lb/in$^2$, 9.0 to 23.0 ft-lb/in$^2$, 9.0 to 22.0 ft-lb/in$^2$, 9.0 to 21.0 ft-lb/in$^2$, 9.0 to 20.0 ft-lb/in$^2$, 9.0 to 19.0 ft-lb/in$^2$, 9.0 to 18.0 ft-lb/in$^2$, 9.0 to 17.0 ft-lb/in$^2$, 9.0 to 16.0 ft-lb/in$^2$, 9.0 to 15.0 ft-lb/in$^2$, 9.0 to 14.0 ft-lb/in$^2$, 9.0 to 13.0 ft-lb/in$^2$, 9.0 to 12.0 ft-lb/in$^2$, 9.0 to 11.0 ft-lb/in$^2$, 9.0 to 10.0 ft-lb/in$^2$, 10.0 to 30.0 ft-lb/in$^2$, 10.0 to 29.0 ft-lb/in$^2$, 10.0 to 28.0 ft-lb/in$^2$, 10.0 to 27.0 ft-lb/in$^2$, 10.0 to 26.0 ft-lb/in$^2$, 10.0 to 25.0 ft-lb/in$^2$, 10.0 to 24.0 ft-lb/in$^2$, 10.0 to 23.0 ft-lb/in$^2$, 10.0 to 22.0 ft-lb/in$^2$, 10.0 to 21.0 ft-lb/in$^2$, 10.0 to 20.0 ft-lb/in$^2$, 10.0 to 19.0 ft-lb/in$^2$, 10.0 to 18.0 ft-lb/in$^2$, 10.0 to 17.0 ft-lb/in$^2$, 10.0 to 16.0 ft-lb/in$^2$, 10.0 to 15.0 ft-lb/in$^2$, 10.0 to 14.0 ft-lb/in$^2$, 10.0 to 13.0 ft-lb/in$^2$, 10.0 to 12.0 ft-lb/in$^2$, 10.0 to 11.0 ft-lb/in$^2$, 11.0 to 30.0 ft-lb/in$^2$, 11.0 to 29.0 ft-lb/in$^2$, 11.0 to 28.0 ft-lb/in$^2$, 11.0 to 27.0 ft-lb/in$^2$, 11.0 to 26.0 ft-lb/in$^2$, 11.0 to 25.0 ft-lb/in$^2$, 11.0 to 24.0 ft-lb/in$^2$, 11.0 to 23.0 ft-lb/in$^2$, 11.0 to 22.0 ft-lb/in$^2$, 11.0 to 21.0 ft-lb/in$^2$, 11.0 to 20.0 ft-lb/in$^2$, 11.0 to 19.0 ft-lb/in$^2$, 11.0 to 18.0 ft-lb/in$^2$, 11.0 to 17.0 ft-lb/in$^2$, 11.0 to 16.0 ft-lb/in$^2$, 11.0 to 15.0 ft-lb/in$^2$, 11.0 to 14.0 ft-lb/in$^2$, 11.0 to 13.0 ft-lb/in$^2$, 11.0 to 12.0 ft-lb/in$^2$, 12.0 to 30.0 ft-lb/in$^2$, 12.0 to 29.0 ft-lb/in$^2$, 12.0 to 28.0 ft-lb/in$^2$, 12.0 to 27.0 ft-lb/in$^2$, 12.0 to 26.0 ft-lb/in$^2$, 12.0 to 25.0 ft-lb/in$^2$, 12.0 to 24.0 ft-lb/in$^2$, 12.0 to 23.0 ft-lb/in$^2$, 12.0 to 22.0 ft-lb/in$^2$, 12.0 to 21.0 ft-lb/in$^2$, 12.0 to 20.0 ft-lb/in$^2$, 12.0 to 19.0 ft-lb/in$^2$, 12.0 to 18.0 ft-lb/in$^2$, 12.0 to 17.0 ft-lb/in$^2$, 12.0 to 16.0 ft-lb/in$^2$, 12.0 to 15.0 ft-lb/in$^2$, 12.0 to 14.0 ft-lb/in$^2$, 12.0 to 13.0 ft-lb/in$^2$, 13.0 to 30.0 ft-lb/in$^2$, 13.0 to 29.0 ft-lb/in$^2$, 13.0 to 28.0 ft-lb/in$^2$, 13.0 to 27.0 ft-lb/in$^2$, 13.0 to 26.0 ft-lb/in$^2$, 13.0 to 25.0 ft-lb/in$^2$, 13.0 to 24.0 ft-lb/in$^2$, 13.0 to 23.0 ft-lb/in$^2$, 13.0 to 22.0 ft-lb/in$^2$, 13.0 to 21.0 ft-lb/in$^2$, 13.0 to 20.0 ft-lb/in$^2$, 13.0 to 19.0 ft-lb/in$^2$, 13.0 to 18.0 ft-lb/in$^2$, 13.0 to 17.0 ft-lb/in$^2$, 13.0 to 16.0 ft-lb/in$^2$, 13.0 to 15.0 ft-lb/in$^2$, 13.0 to 14.0 ft-lb/in$^2$, 14.0 to 30.0 ft-lb/in$^2$, 14.0 to 29.0 ft-lb/in$^2$, 14.0 to 28.0 ft-lb/in$^2$, 14.0 to 27.0 ft-lb/in$^2$, 14.0 to 26.0 ft-lb/in$^2$, 14.0 to 25.0 ft-lb/in$^2$, 14.0 to 24.0 ft-lb/in$^2$, 14.0 to 23.0 ft-lb/in$^2$, 14.0 to 22.0 ft-lb/in$^2$, 14.0 to 21.0 ft-lb/in$^2$, 14.0 to 20.0 ft-lb/in$^2$, 14.0 to 19.0 ft-lb/in$^2$, 14.0 to 18.0 ft-lb/in$^2$, 14.0 to 17.0 ft-lb/in$^2$, 14.0 to 16.0 ft-lb/in$^2$, 14.0 to 15.0 ft-lb/in$^2$, 15.0 to 30.0 ft-lb/in$^2$, 15.0 to 29.0 ft-lb/in$^2$, 15.0 to 28.0 ft-lb/in$^2$, 15.0 to 27 ft-lb/in$^2$, 15.0 to 26.0 ft-lb/in$^2$, 15.0 to 25.0 ft-lb/in$^2$, 15.0 to 24.0 ft-lb/in$^2$, 15.0 to 23.0 ft-lb/in$^2$, 15.0 to 22.0 ft-lb/in$^2$, 15.0 to 21.0 ft-lb/in$^2$, 15.0 to 20.0 ft-lb/in$^2$, 15.0 to 19.0 ft-lb/in$^2$, 15.0 to 18.0 ft-lb/in$^2$, 15.0 to 17.0 ft-lb/in$^2$, 15.0 to 16.0 ft-lb/in$^2$, 16.0 to 30.0 ft-lb/in$^2$, 16.0 to 29.0 ft-lb/in$^2$, 16.0 to 28.0 ft-lb/in$^2$, 16.0 to 27.0 ft-lb/in$^2$, 16.0 to 26.0 ft-lb/in$^2$, 16.0 to 25.0 ft-lb/in$^2$, 16.0 to 24.0 ft-lb/in$^2$, 16.0 to 23.0 ft-lb/in$^2$, 16.0 to 22.0 ft-lb/in$^2$, 16.0 to 21.0 ft-lb/in$^2$, 16.0 to 20.0 ft-lb/in$^2$, 16.0 to 19.0 ft-lb/in$^2$, 16.0 to 18.0 ft-lb/in$^2$, 16.0 to 17.0 ft-lb/in$^2$, 17.0 to 30.0 ft-lb/in$^2$, 17.0 to 29.0 ft-lb/in$^2$, 17.0 to 28.0 ft-lb/in$^2$, 17.0 to 27.0 ft-lb/in$^2$, 17.0 to 26.0 ft-lb/in$^2$, 17.0 to 25.0 ft-lb/in$^2$, 17.0 to 24.0 ft-lb/in$^2$, 17.0 to 23.0 ft-lb/in$^2$, 17.0 to 22.0 ft-lb/in$^2$, 17.0 to 21.0 ft-lb/in$^2$, 17.0 to 20.0 ft-lb/in$^2$, 17.0 to 19.0 ft-lb/in$^2$, 17.0 to 18.0 ft-lb/in$^2$, 18.0 to 30.0 ft-lb/in$^2$, 18.0 to 29.0 ft-lb/in$^2$, 18.0 to 28.0 ft-lb/in$^2$, 18.0 to 27.0 ft-lb/in$^2$, 18.0 to 26.0 ft-lb/in$^2$, 18.0 to 25.0 ft-lb/in$^2$, 18.0 to 24.0 ft-lb/in$^2$, 18.0 to 23.0 ft-lb/in$^2$, 18.0 to 22.0 ft-lb/in$^2$, 18.0 to 21.0 ft-lb/in$^2$, 18.0 to 20.0 ft-lb/in$^2$, 18.0 to 19.0 ft-lb/in$^2$, 19.0 to 30.0 ft-lb/in$^2$, 19.0 to 29.0 ft-lb/in$^2$, 19.0 to 28.0 ft-lb/in$^2$, 19.0 to 27.0 ft-lb/in$^2$, 19.0 to 26.0 ft-lb/in$^2$, 19.0 to 25.0 ft-lb/in$^2$, 19.0 to 24.0 ft-lb/in$^2$, 19.0 to 23.0 ft-lb/in$^2$, 19.0 to 22.0 ft-lb/in$^2$, 19.0 to 21.0 ft-lb/in$^2$, 19.0 to 20.0 ft-lb/in$^2$, 20.0 to 30.0 ft-lb/in$^2$, 20.0 to 29.0 ft-lb/in$^2$, 20.0 to 28.0 ft-lb/in$^2$, 20.0 to 27.0 ft-lb/in$^2$, 20.0 to 26.0 ft-lb/in$^2$, 20.0 to 25.0 ft-lb/in$^2$, 20.0 to 24.0 ft-lb/in$^2$, 20.0 to 23.0 ft-lb/in$^2$, 20.0 to 22.0 ft-lb/in$^2$, 20.0 to 21.0 ft-lb/in$^2$, 21.0 to 30.0 ft-lb/in$^2$, 21.0 to 29.0 ft-lb/in$^2$, 21.0 to 28.0 ft-lb/in$^2$, 21.0 to 27.0 ft-lb/in$^2$, 21.0 to 26.0 ft-lb/in$^2$, 21.0 to 25.0 ft-lb/in$^2$, 21.0 to 24.0 ft-lb/in$^2$, 21.0 to 23.0 ft-lb/in$^2$, 21.0 to 22.0 ft-lb/in$^2$, 22.0 to 30.0 ft-lb/in$^2$, 22.0 to 29.0 ft-lb/in$^2$, 22.0 to 28.0 ft-lb/in$^2$, 22.0 to 27.0 ft-lb/in$^2$, 22.0 to 26.0 ft-lb/in$^2$, 22.0 to 25.0 ft-lb/in$^2$, 22.0 to 24.0 ft-lb/in$^2$, 22.0 to 23.0 ft-lb/in$^2$, 23.0 to 30.0 ft-lb/in$^2$, 23.0 to 29.0 ft-lb/in$^2$, 23.0 to 28.0 ft-lb/in$^2$, 23.0 to 27.0 ft-lb/in$^2$, 23.0 to 26.0 ft-lb/in$^2$, 23.0 to 25.0 ft-lb/in$^2$, 23.0 to 24.0 ft-lb/in$^2$, 24.0 to 30.0 ft-lb/in$^2$, 24.0 to 29.0 ft-lb/in$^2$, 24.0 to 28.0 ft-lb/in$^2$, 24.0 to 27.0 ft-lb/in$^2$, 24.0 to 26.0 ft-lb/in$^2$, 24.0 to 25.0 ft-lb/in$^2$, 25.0 to 30.0 ft-lb/in$^2$, 25.0 to 29.0 ft-lb/in$^2$, 25.0 to 28.0 ft-lb/in$^2$, 25.0 to 27.0 ft-lb/in$^2$, 25.0 to 26.0 ft-lb/in$^2$, 26.0 to 30.0 ft-lb/in$^2$, 26.0 to 29.0 ft-lb/in$^2$, 26.0 to 28.0 ft-lb/in$^2$, 26.0 to 27.0 ft-lb/in$^2$, 27.0 to 30.0 ft-lb/in$^2$, 27.0 to 29.0 ft-lb/in$^2$, 27.0 to 28.0 ft-lb/in$^2$, 28.0 to 30.0 ft-lb/in$^2$, 28.0 to 29.0 ft-lb/in$^2$, 29.0 to 30.0 ft-lb/int.

In embodiments, the decorative layer 18 will comprise a UV resistant material exhibiting a resistance to fading, cracking, loss of gloss, color stability when exposed to full spectrum sunlight (e.g. UV light, visible light and infrared (IR) light).

The roofing system 10 further will include a substrate 20 or base layer. As shown in FIGS. 2-3, in embodiments, the substrate 20 can comprise a separate, base layer below the second layer 14 (e.g. the decorative layer 18) such that the second layer is positioned between the substrate 20 and the first layer 12 (e.g. the translucent layer 16). In one embodiment, as indicated in FIG. 1, the decorative layer 18 can make up the substrate 20 of the roofing material 11, in whole or in part, and may include, but is not limited to, a mat, scrim, mesh or netting woven into a geometric or randomized decorative lattice. The substrate further can include the decorative features or portions 18A, e.g., be colored or painted, and will be visible through the translucent layer 12. In addition to or alternatively, the substrate 20 can comprise a decking material 21 (FIGS. 1-3) of the roof deck R over which the roofing material 11 is applied.

As FIGS. 2-3 indicate, the roofing material 11 further can include an additional substrate or base layer 20 over which the translucent layer 16 and the decorative layer 18 are positioned (FIGS. 2-3). In this regard, the translucent layer 16 and decorative layer 18 are configured to be mounted along the substrate 20 such as by fasteners, adhesive materials or other attachment. The decorative layer 18 will be visible through the translucent layer 12 after the translucent layer 12 and decorative layer 18 are mounted to the substrate 20.

FIGS. 2-3 further indicate that the decorative layer 14 can be located or positioned between the translucent layer 16 and the substrate 20. For example, the decorative layer 18 can be applied to the translucent layer 16 by embedding, embossing, adhering, etching, painting, dyeing, laminating, printing, or combinations thereof. The decorative features 18A of the decorative layer 18 will be visible through the first, translucent layer 16. The decorative layer 18 can have a thickness of 5 mils to 250 mils, although other, greater or lesser thicknesses also can be used. For example, but without limitation, in embodiments, the decorative layer can have a thickness of 5 mils to 225 mils, 5 mils to 200 mils, 5 mils to 175 mils, 5 mils to 150 mils, 5 mils to 125 mils, 5 mils to 100 mils, 5 mils to 75 mils, 5 mils to 50 mils, 5 mils to 25 mils, 1 mil to 10 mils, 1 mils to 25 mils, 1 mil to 50 mils, 1 mil to 75 mils, 1 mil to 100 mils, 1 mil to 125 mils, 1 mil to 150 mils, 1 mil to 175 mils, 1 mil to 200 mils, 1 mil to 225 mils, and/or 1 mil to 250 mils.

The first and second layers 12/14, e.g. the translucent and decorative layers 12/14, can be separate and distinct layers. However, in additional or alternative, constructions, the translucent layer and the decorative layer can be part of the same layer. That is, the decorative layer, comprising one or more decorative features 18A, can be integrated with the translucent layer. For example, as indicated in FIGS. 7-9e the decorative layer 18 can comprise a substrate 18B that can include an extruded, woven, textured, embossed or patterned mat, fabric or sheet, or combinations thereof integrated with the translucent layer. In additional example embodiments, the translucent layer can include a polymer material with decorative features 18A integrated therewith. For example, such decorative features can include colorful materials such as dies, printing, colored fibers or other components to further enhance the visual appearance of the decorative layer.

Figure 4A:
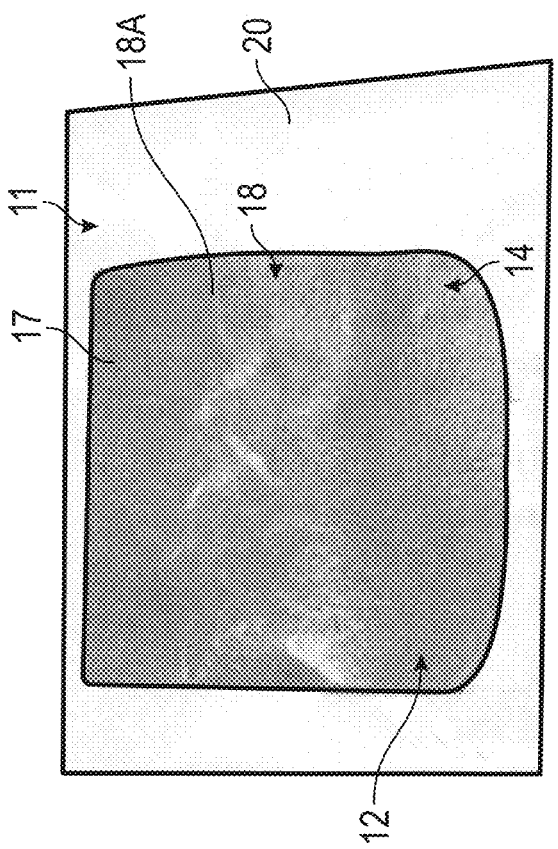
FIGS. 4a-4c show example roofing materials according to aspects of the present disclosure.
Figure 4B:
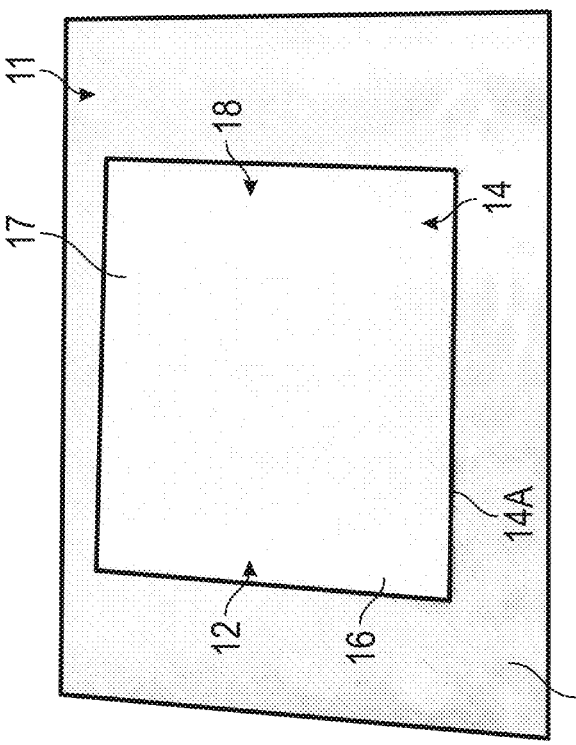
Figure 4C:
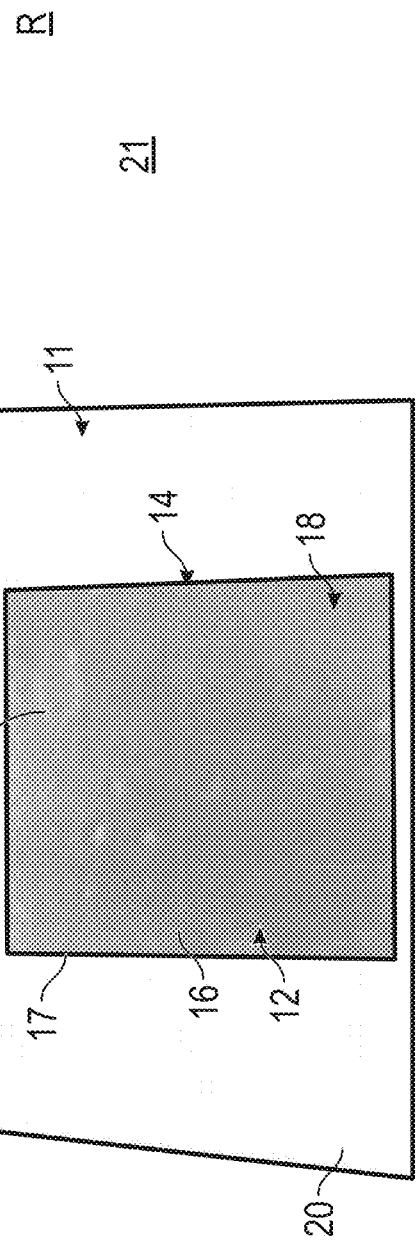
Figure 6A:
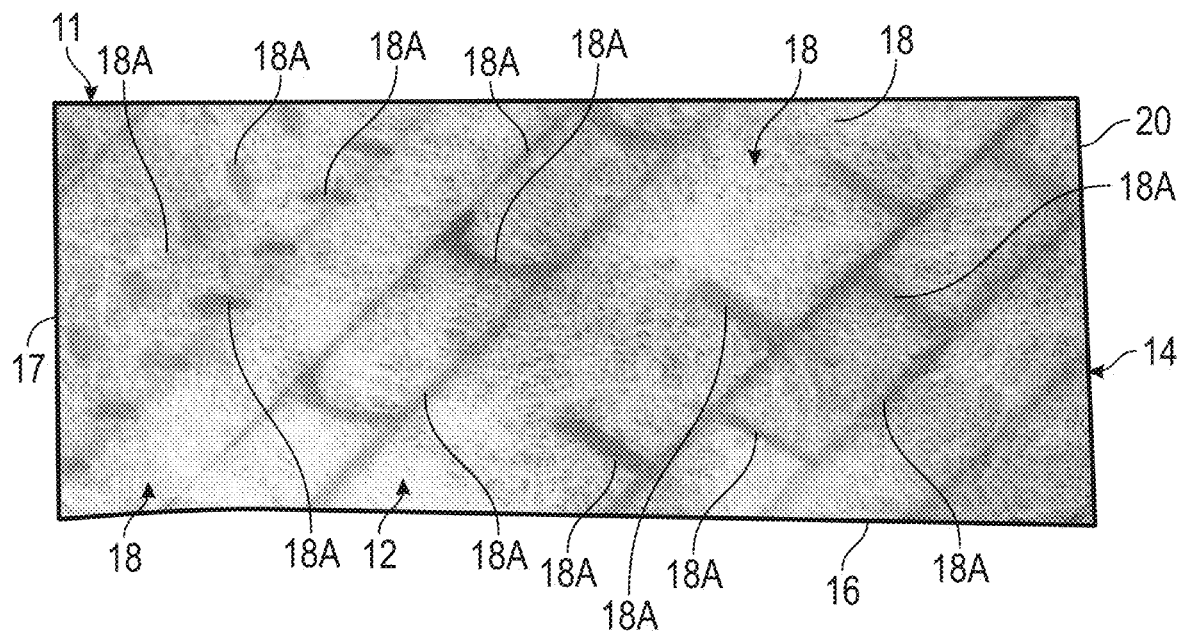
FIGS. 6a-6b show example roofing material according to another aspect of the present disclosure.
Figure 6B:
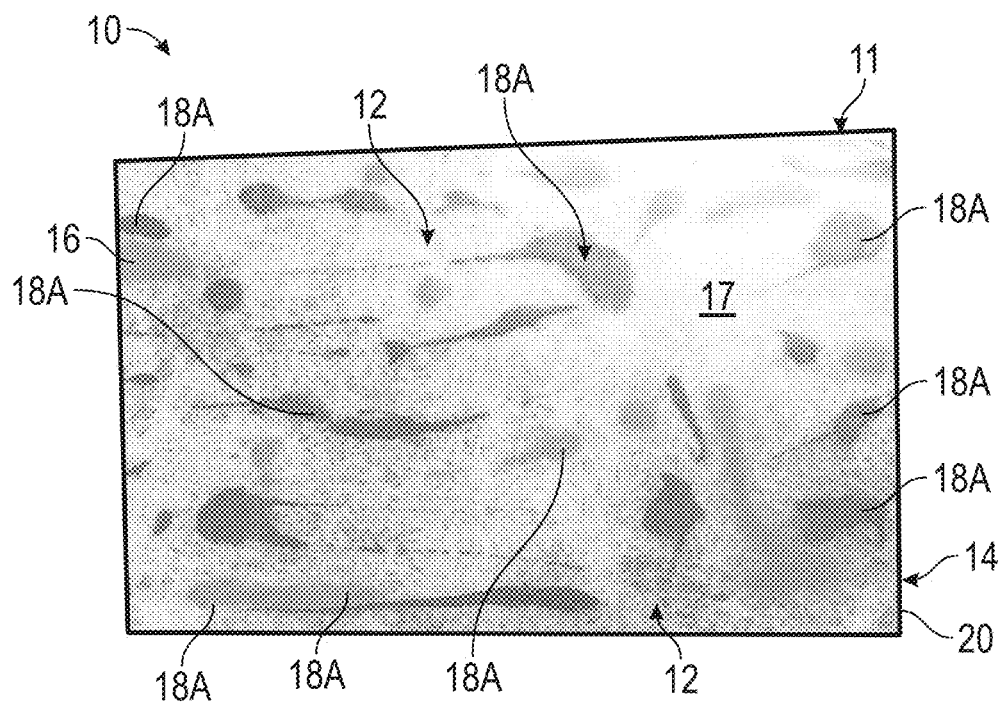

In other embodiments, such illustrated in FIGS. 4a-4c the decorative features 18 can include one or more particles, chips, dyes, or tinting materials received within the polymer material of the translucent layer 16. In this regard, the decorative features 18A can be mixed or otherwise dispersed with the polymer material prior to formation of the translucent layer 16, e.g., prior to setting or hardening of the polymer material thereof. In some embodiments, as shown in FIGS. 6a-6b the decorative features 18A can include a woven or non-woven or needle-punched fabric, mat or strips, chips, particles, a picture or pictures, one or more images, a textured appearance, or combination thereof. In other embodiments, as shown in FIGS. 5a-5b, the decorative features can be adhered, embedded or embossed into the lower surface 12A of the first layer 12 (e.g. translucent layer).

In addition, as indicated in FIG. 1, the roof system 10 can include a protective layer 22 applied along the decorative layer 18, and in some embodiments, integrated with the decorative and/or translucent layers (e.g. as part of a substantially integrated sheet of roofing material). The protective layer 22 can be applied to a bottom surface 14A of the decorative layer 18, and can be left in place after installation of the roofing material. In embodiments, the protective layer 22 will comprise a film, sheet, or coating, such as a polymer sheet, applied to the bottom surface 14A of the decorative layer. In addition, or in the alternative, the protective layer 22 comprises a waterproof membrane.

In embodiments, the protective layer 22 is configured to be removable from the decorative layer 18 (or the integrated decorative and translucent layers). For example, the protective layer 22 can be configured to be removed, e.g., peeled or rolled off or otherwise taken away, from the bottom surface 14A of the decorative layer to reveal an adhesive layer or portions of an adhesive material along the bottom surface 14A. In this regard, as shown in FIG. 1, an adhesive material 24 is applied to the bottom surface 14A, such that the protective layer 22 can be removed to expose the adhesive material 24 prior to the positioning of the translucent and decorative layers over the substrate 20. The adhesive material 24 can be configured to facilitate attachment of the translucent and decorative layers to the substrate 20.

The protective layer 22 can comprise various protective covering materials such as fabrics, mats, webs, mesh materials, and/or sheets, which can include, in some non-limiting examples, polypropylene, polyethylene, polyacrylate, polycarbonate, ethylene-vinyl acetate, silicone, polyvinyl fluoride, polyvinyl chloride, polyurethane, polyvinylidene fluoride, fluorinated ethylene propylene, or combinations thereof. The protective layer 22 further can have a thickness of 5 mils to 100 mils, although other, greater or lesser thicknesses also can be used. For example, but without limitation, in various embodiments, the protective layer can have a thickness of 5 mils to 150 mils, 5 mils to 125 mils, 5 mils to 100 mils, 5 mils to 75 mils, 5 mils to 50 mils, 5 mils to 25 mils, 1 mil to 10 mils, 1 mils to 25 mils, 1 mil to 50 mils, 1 mil to 75 mils, and/or 1 mil to 100 mils.

FIGS. 2-3 further show an additional coating layer or region 30 positioned or otherwise located between the translucent and decorative layers 16/18 and the substrate 20. The additional, coating layer 30 can include a waterproofing layer that is positioned along the substrate 20 and over which the translucent and decorative layers are received. For example, a top or upper surface 20A of the substrate 20 can be coated with a translucent water shedding or waterproofing coating 30. The waterproofing layer 30 can comprise asphalt, styrene butadiene styrene, polypropylene, polyethylene, polyacrylate, polycarbonate, ethylene-vinyl acetate, silicone, polyvinyl fluoride, polyvinyl chloride, polyurethane, polyvinylidene fluoride, fluorinated ethylene propylene, or combinations thereof, with or without a plasticizer or oils, and with or without a filler material.

The waterproofing layer 30, in some embodiments, can have a thickness of 5 mils to 300 mils, although other, greater or lesser thicknesses also can be used. For example, but without limitation, in various embodiments, the waterproofing layer can have a thickness of 5 mils to 500 mils, 5 mils to 450 mils, 5 mils to 400 mils, 5 mils to 350 mils, 5 mils to 300 mils, 5 mils to 250 mils, 5 mils to 225 mils, 5 mils to 200 mils, 5 mils to 175 mils, 5 mils to 150 mils, 5 mils to 125 mils, 5 mils to 100 mils, 5 mils to 75 mils, 5 mils to 50 mils, 5 mils to 25 mils, 1 mil to 10 mils, 1 mils to 25 mils, 1 mil to 50 mils, 1 mil to 75 mils, 1 mil to 100 mils, 1 mil to 125 mils, 1 mil to 150 mils, 1 mil to 175 mils, 1 mil to 200 mils, 1 mil to 225 mils, 1 mil to 250 mils, 1 mil to 275 mils, 1 mil to 300 mils, 1 mil to 400 mils, and/or 1 mil to 500 mils.

FIG. 3 shows that, in some embodiments, an additional coating layer or region 32 further can be positioned along the substrate 20. The coating layer 32 can be position along an opposing side of the substrate 20 in relation to the coating layer 30 and/or the translucent and decorative layers. That is, the coating layer 32 can be applied over a bottom or lower surface 20B of the substrate (FIG. 3).

In one embodiment, the coating layer 32 includes a vapor barrier that is applied to the substrate 20. The vapor barrier is configured to provide transmission of water vapor therethrough. In additional, or alternative embodiments, the coating layer 32 can include a filled coating material, such as asphalt or filled polymer modified coating, which is not translucent.

The coating layer 32 can comprise a liquid coating, a sheet, film, or other coating material, which can include, without limitation, asphalt, styrene butadiene styrene, polypropylene, polyethylene, polyacrylate, polycarbonate, ethylene-vinyl acetate, silicone, polyvinyl fluoride, polyvinyl chloride, polyurethane or combinations thereof with or without a plasticizer or oils, and with or without filler. The coating layer 32 can have a thickness of 5 mils to 100 mils, although other, greater or lesser thicknesses also can be used. For example, but without limitation, in various embodiments, the vapor barrier can have a thickness of 5 mils to 150 mils, 5 mils to 125 mils, 5 mils to 100 mils, 5 mils to 75 mils, 5 mils to 50 mils, 5 mils to 25 mils, 1 mil to 10 mils, 1 mils to 25 mils, 1 mil to 50 mils, 1 mil to 75 mils, and/or 1 mil to 100 mils.

In embodiments, the decorative features 18A of the decorative layer can also comprise a plurality of lights or other lighted portions, which can be used with existing decorative features 18A, or in place of such decorative features. The plurality of lights can be attached or embedded into the decorative layer and used to create various visual effects or decorative features that will be visible through the translucent layer. In one embodiment, the plurality of lights can include minimal heat generating light sources, such as LEDs or other low heat light bulbs. The plurality of lights can be arranged along a lower surface of the decorative layer 18 and can be configured and controlled to project at least one image, video, picture, color, design, pattern, or combinations thereof. In such embodiments, the roofing system 10 further can include a controller, such as a processor or control circuitry, that is operable to selectively control the plurality of lights to create an image, design, picture, video, color, pattern, or combinations thereof, displayed through the upper surface of the first or translucent layer.

FIGS. 4a-4c show some various examples of a roofing material 11 according to aspects of the present disclosure. FIG. 4a shows a roofing material 11 with a mesh substrate 20 over which a first layer 12 and a second layer 14 are applied, the second layer comprising a decorative layer 18 including a color, e.g., white, as a decorative feature. FIGS. 4b-4c show a roofing material 11 with a textured decorative layer 18 including a color, e.g., brown or black, as further decorative features 18A. In FIGS. 4a-4c, the roofing material 11 includes a translucent layer 16 applied over the decorative layer.

FIGS. 5a-5b show roofing materials 11 according to other aspects of this disclosure. In FIGS. 5a-5b, the roofing materials 11 include a first layer 12 comprising a translucent layer 16, and a decorative base or second layer 14 comprising a decorative layer 18 including a printed image or pattern as decorative features 18A. The decorative layer is capped by the translucent layer 16, which comprises a translucent weathering film or coating, applied during manufacture or installation of the roofing material. In this regard, the decorative layer is applied on one side of the translucent layer, with the translucent layer capping the decorative layer. FIG. 5a shows an example of a translucent layer comprising amorphous poly alpha olefin ("APAO") that caps a printed decorative layer 18, e.g., a sheet with a design printed thereon, such that the decorative layer is sealed and protected from water and air. In other embodiments, the translucent layer 16 can include other materials, such as for example, and not limitation, an FEP material that is positioned over the decorative layer as a capping or weathering layer. The translucent layer of such an embodiment can be adhered to a printed decorative layer 18, e.g., a sheet with a design printed thereon. In such embodiments, the translucent layer 16 may be loosely bonded to the decorative layer 18 and not completely sealed. Other layers, e.g. one or more protective layers also can be applied to such roofing material.

FIGS. 6a-6b show an example roofing material 11 according to another embodiment of the present disclosure. In FIGS. 6a-6b, the roofing material 11 includes a decorative layer 18, which includes a painted mat as decorative features 18A, that is coated with translucent layer 16, which includes a translucent polymer 17. The roofing material also has decorative features 18A including colored or dyed portions mixed dispersed with the translucent polymer, e.g., prior to formation of the translucent layer 12.

Figure 7:
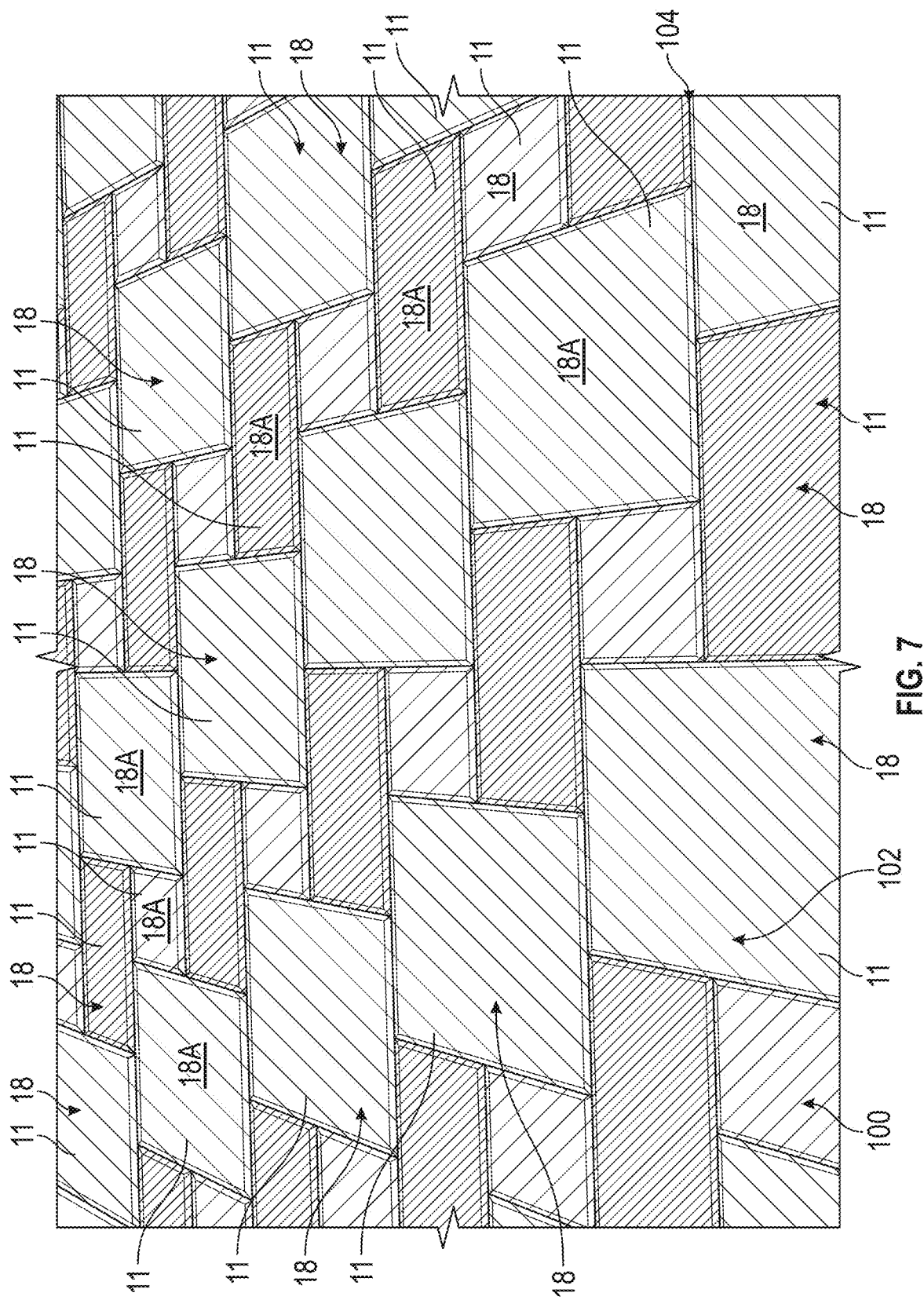
FIG. 7 shows an example roofing material according to yet another aspect of the present disclosure.

FIG. 7 shows a roof system 100 with a plurality of roofing materials 11, e.g., here shown in an embodiment as including roofing tiles, having various, different decorative features 18A, e.g., different colors, and various different sizes and configurations that are arranged to provide a patterned design 102 along a roof deck 104. In this embodiment, the roofing materials can be formed as sheets, panels, tiles or roofing shingles and can be arranged in different patterns to create a desired decorative appearance. By way of example, FIG. 7 shows a rug pattern design, with the roofing materials installed in a staggered or offset geometric design. While the roofing materials are shown in this embodiment, and others in this disclosure, as rectangular of square, other shapes also can be used, including trapezoidal roofing shingle designs (e.g. as shown in FIGS. 10b-11) or other shapes.

Figure 8A:
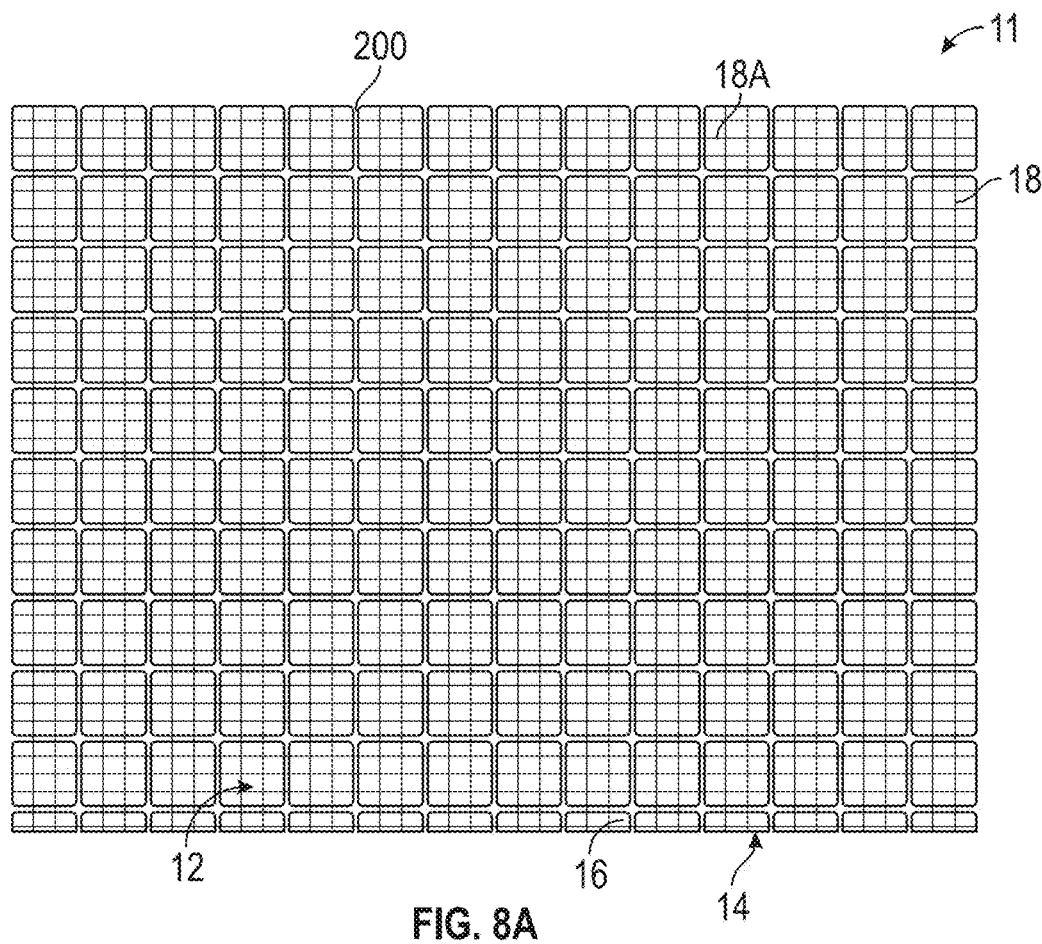
FIGS. 8a-8b show example roofing materials with solar panels according to further aspects of the present disclosure.
Figure 8B:
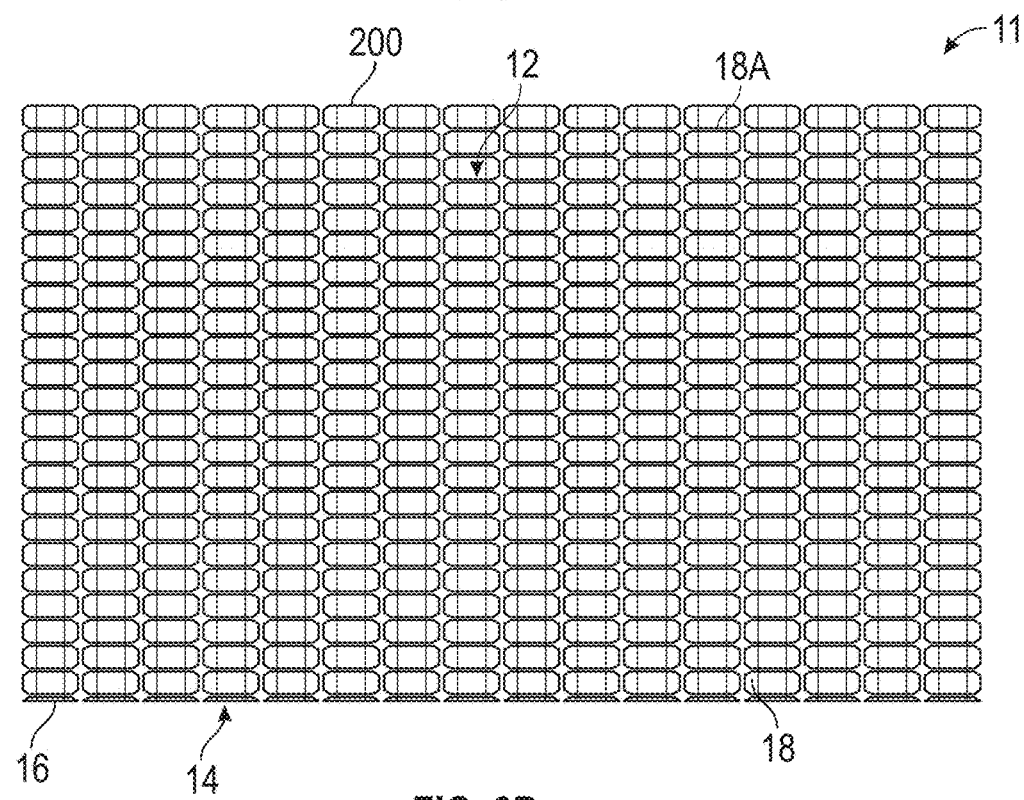
Figure 9B:
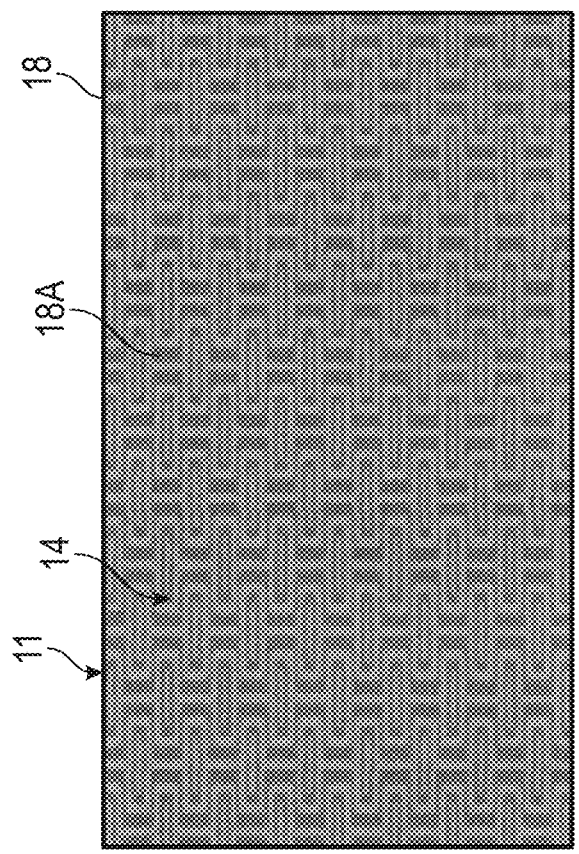
FIGS. 9a-9e show example roofing materials according to even further aspects of the present disclosure.
Figure 9A:
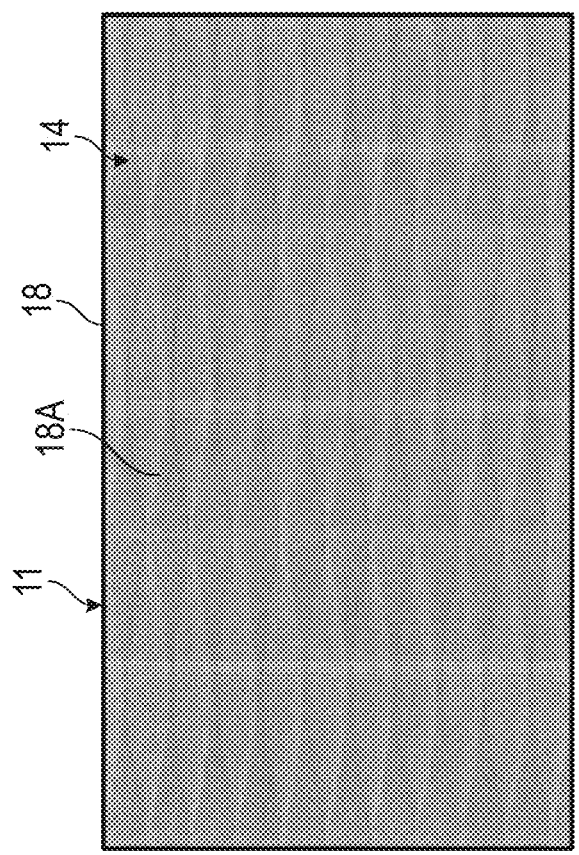
Figure 9E:
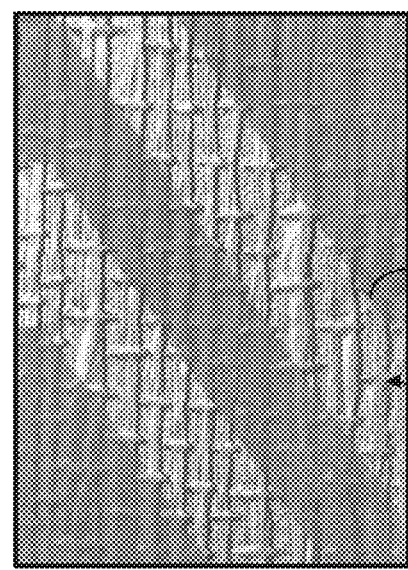
Figure 9D:
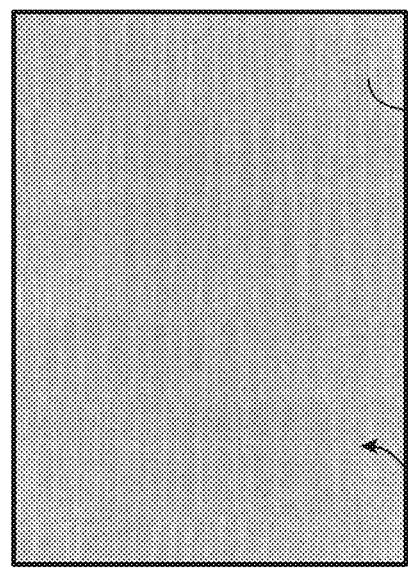
Figure 9C:
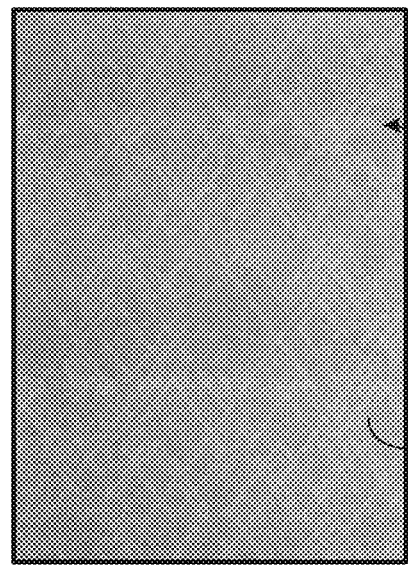

FIGS. 8a-8b show example roofing materials 11 according to further aspects of the present disclosure. As indicated in FIGS. 8a-8b, in some embodiments, the roofing materials 11 can include a plurality of active or deactivated solar panels 200 positioned along the translucent or decorative layers. For example, in embodiments, the decorative layer 18 can include the solar panels 200 as decorative features 18A of the decorative layer, and the translucent layer 16 can be provided thereover.

FIGS. 9a-9e show various examples of decorative layers 18, e.g., including printed laminate designs, according to embodiments of the present disclosure. These decorative layers can include printed designs or sheets that can have a pattern, including a repeating design, image, picture or pattern; or can have colors, textures and/or variations thereof, including, for example, woven, non-woven, knitted, needle-punched or other textured fabrics or sheets, films or sheets molded, stamped, embossed, or otherwise formed with a textured or patterned appearance. The decorative layers also can include multiple sublayers laminated together, or can include a base or sublayer with printing, chips, particles, images, or other decorative features applied therealong.

Figure 10A:
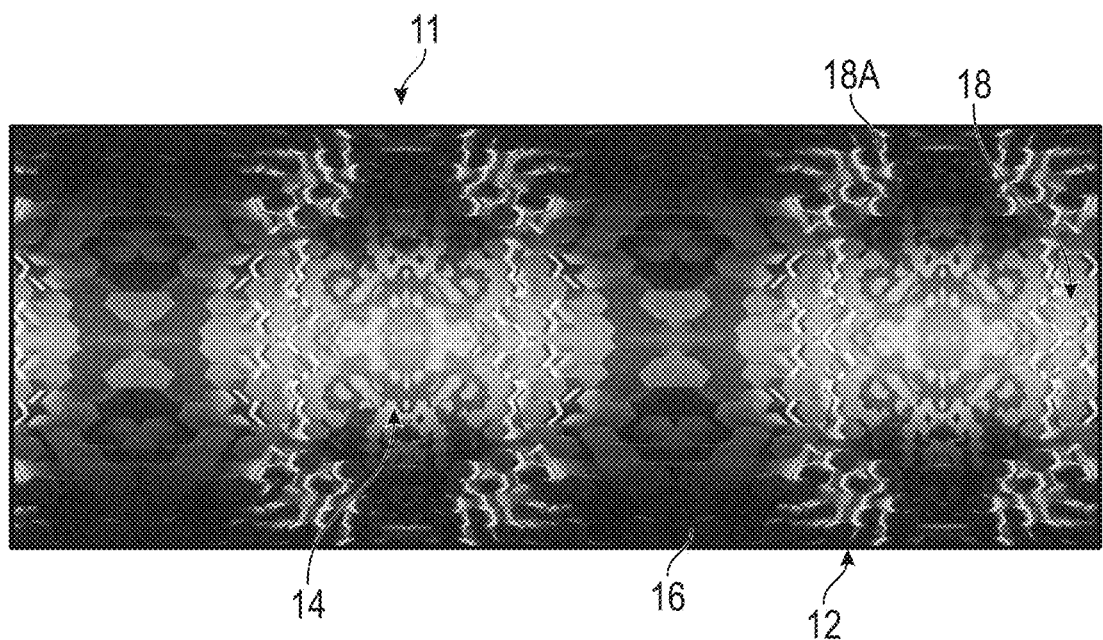
FIGS. 10a-10c show an example embodiment of a decorative or aesthetic color pattern for forming a roofing material such as a sheet, membrane, panel, roofing shingle or tile according to principles of the present disclosure.
Figure 10B:
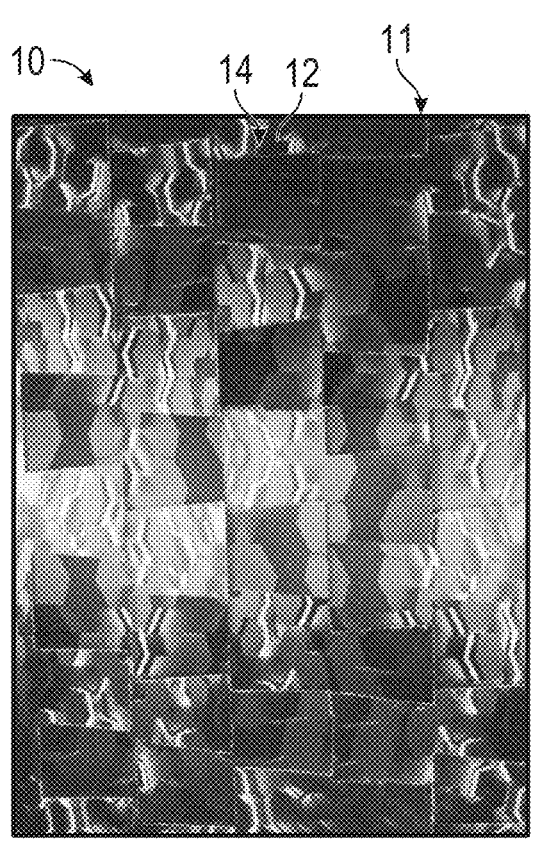
Figure 10C:
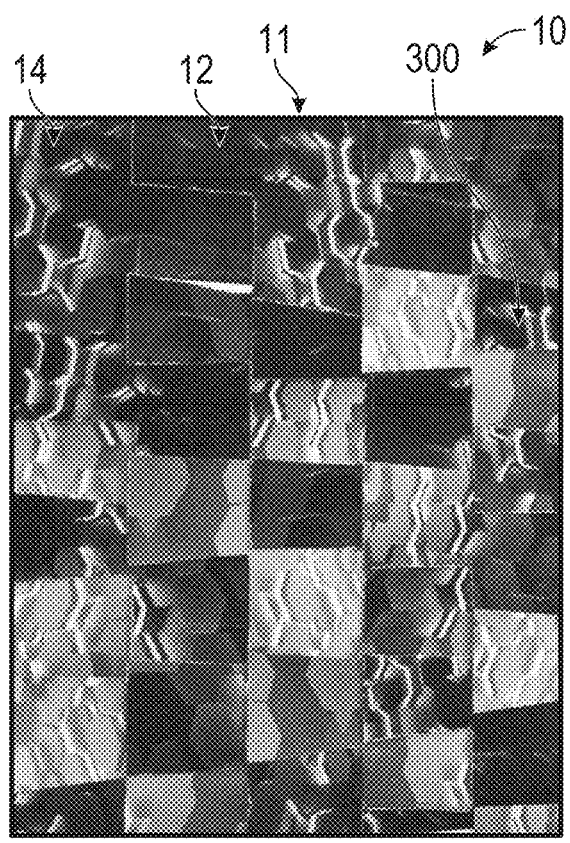
Figure 11:
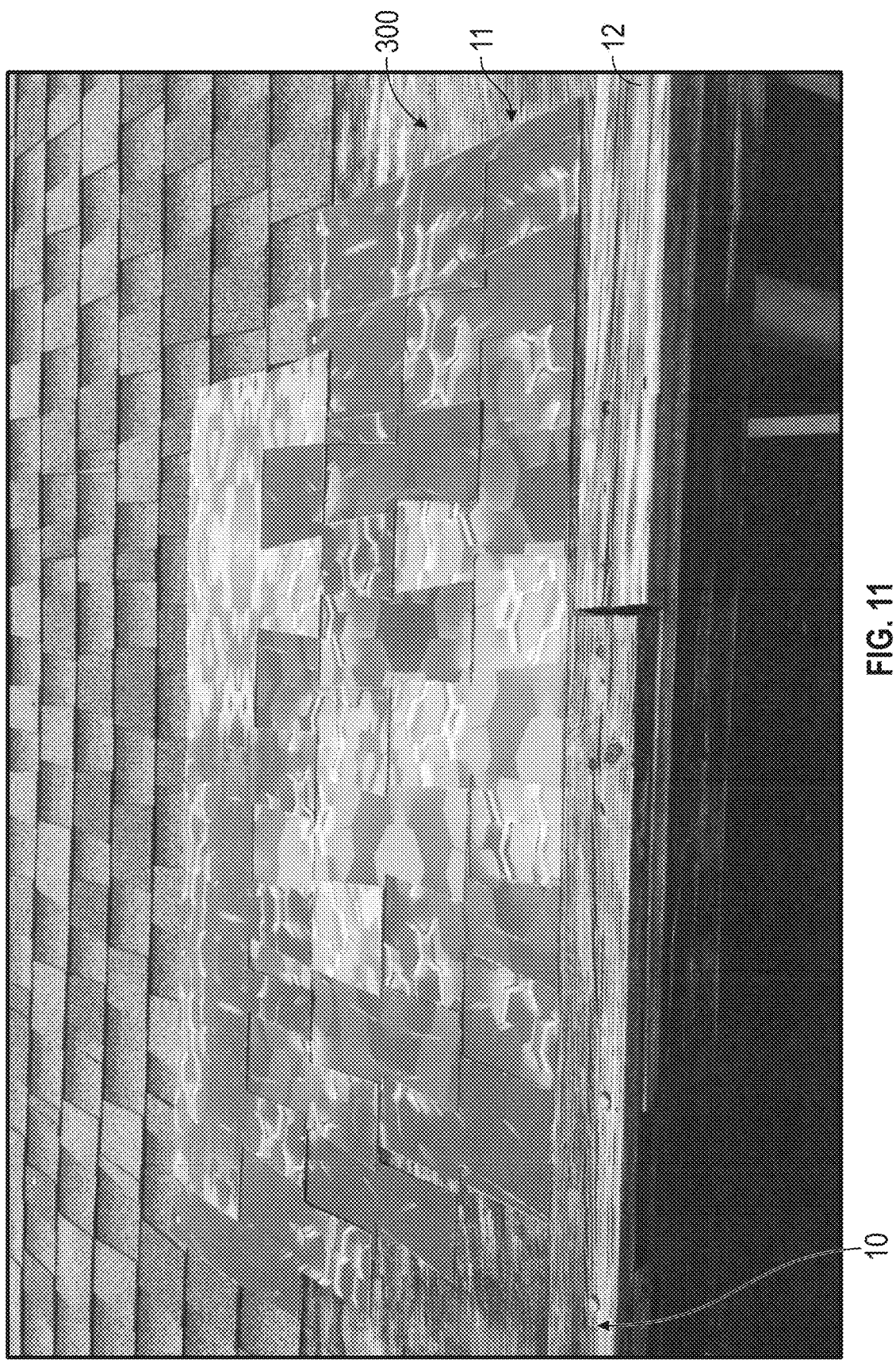
FIG. 11 is a photograph of a series of roofing shingles incorporating a design such as shown in FIGS. 10a-10c installed on a roof for testing resistance of the roofing shingles when exposed to weather.

In some embodiments, such as illustrated in FIGS. 10a-10c, roofing material 11 can include a decorative layer 18 having repeating patterns or designs that can be printed or otherwise formed and applied in register to a substrate, and can be laminated or otherwise applied or affixed to the translucent protective layer 16 during formation of the roofing materials 11. By way of example, in addition to existing designs, colored or patterned materials, a customer or designer could create a customized decorative pattern or design that can be used to form the decorative layer that is applied to or integrated with the translucent layer to form the roofing materials 11. As a further step of the method of forming decorative roofing materials, the roofing materials 11 can be cut to sizes and/or configurations for application to a roof deck, such as being be formed as sheets, panels, roofing shingles, tiles, shakes or other traditional roofing materials.

For example, as illustrated in FIGS. 10b-11, in an embodiment, a series of roofing shingles 300 having a toothed or other, similar configurations, such as Timberline® HDZ™ roofing shingles from GAF of Parsippany, New Jersey, can be formed, with each of the shingles incorporating various portions of the design shown in FIG. 10a. As a result, a variety of installation options can be provided for forming a roof. Such installation patterns can enable or facilitate ease of installation and/or removal of the roofing materials, as well as greater customization of the appearance of a roof.

For example, in embodiments, the roofing shingles 300 can be laid out in various arrangements along a roof deck R. As shown in FIG. 11, the roofing shingles 300 can be laid out in a pattern substantially matching the selected design; while in other embodiments, portions of the decorative or aesthetic color patterns or designs created by the installed roofing shingles can be changed by orienting or disorienting adjacent roofing shingles during installation, such as illustrated in FIGS. 10b and 10c, and as a further alternative, in FIG. 11. Various mosaic patterns and other complex designs for creation of a decorative roof appearance thus can be created or obtained for a given color sheet or design.

In other embodiments, the roofing materials 11 can be formed as sheet materials that can be rolled out over the roof deck and secured with adhesives and/or fasteners. The roofing materials also can be formed as panels or individual sheets that can be positioned along the roof deck in varying arrangements.

In addition, in some embodiments, the look of a laminate roofing shingle can be created without necessarily requiring laminating a backer to the roofing materials by cutting alternating small and wide roofing shingles. These small and wide roofing shingles then can be installed along the roof deck adjacent one another in close proximity. Such an installation can lead to potential reductions in adhesive use. Still further, by not laminating a backer to the roofing material, the need for a nail zone also can be substantially reduced or minimized, which in turn further can help significantly increase installation speeds.

FIG. 11 illustrates an installation of roofing shingles 300 incorporating the design of FIG. 10a, with the roofing shingles arranged along a roof deck. The roofing shingles 300 were laid out in a random pattern and left on the roof deck and exposed to weather, e.g. exposed to varying environmental conditions such as sunlight (including UV light, direct visible light, IR light), wind, rain, snow, substantial temperature variations (e.g. elevated temperatures over 100° F. and cold temperatures below 15° F.), hail or other impacts, etc., for a period of a year. During that time, the installation was monitored and no noticeable change in aesthetics or performance was found, e.g. no substantive incidence of haze, yellowness, color changes, loss of gloss, cracking, peeling, chalking, and/or changes in physical properties such as brittleness and/or loss of impact strength due to exposure to full spectrum sunlight (e.g., UV light, visible light and infrared (IR) light), and extreme cold and elevated temperatures (e.g. temperatures below 15° F. and above 100° F. for over the one-year period.

The present disclosure also provides a method for forming a roofing system. The method includes moving a sheet of translucent polymer material along a processing path, and applying a decorative layer or decorative features to at least one side surface of the sheet of translucent polymer material. The decorative layer or decorative features can comprise an image, pattern, design, color, picture, textured appearance, or combinations thereof. In addition, the method includes applying a protective layer to the decorative layer opposite the at least one side surface of the sheet of translucent polymer material. The method further includes forming a plurality of roofing shingles from the sheet of translucent polymer material. The roofing shingles each include an upper surface adapted to be exposed to weather, and wherein the image, pattern, design, color photograph, textured appearance, or combinations thereof of the decorative layer is visible through the upper surface of each roofing shingle.

In embodiments, applying the decorative layer to the sheet of translucent polymer material comprises printing, painting, etching, laminating, adhering, embedding, or embossing the image, pattern, design, color, picture, textured appearance, or combinations thereof along the at least one side surface of the sheet of translucent polymer material. The sheet of translucent polymer material further can comprise an extruded, woven, printed, colored, textured, or patterned mat, fabric, or sheet.

Furthermore, in one embodiment, the method can include positioning a plurality of lights along the decorative layer. The plurality of lights is selectively controllable to create an image, design, picture, video, color, pattern, or combinations thereof, displayed through the upper surface of the sheet of translucent polymer material. In addition, or in the alternative, the method further comprises positioning a plurality of solar cells along the decorative layer.

In some embodiments, the protective layer can have a gloss or an opacity that can be selectively varied depending on a particular installation or application, such as installations with direct exposure to sunlight. For example, in embodiments, pigments, tinting agents and/or coatings can be added to the translucent protective layer to provide the translucent protective layer with an ability to substantially continuously adjust a tint thereof depending on light angle and light intensity. In still other embodiments, solar reflectance of the roofing materials can be varied and/or improved based on selection of materials for the translucent protective layer and the decorative layer, and/or based on selection of colors or construction design of the translucent protective and decorative layers.

The present disclosure has been described herein in terms of examples that illustrate principles and aspects of the present disclosure. The skilled artisan will understand, however, that a wide gamut of additions, deletions, and modifications, both subtle and gross, may be made to the presented examples without departing from the spirit and scope of the present disclosure.

The invention claimed is:

1. A roof system, comprising:
   a substrate;
   a first layer positioned over the substrate, the first layer comprising a translucent material adapted to be exposed to weather;
   a second layer between the first layer and the substrate, the second layer comprising a decorative layer including an image, design, color, pattern, picture, fabric, or combinations thereof; and
   a protective layer positioned along the second layer;
   wherein the decorative layer comprises an ultraviolet resistant material;
   wherein the decorative layer is visible through the first layer;
   wherein the second layer comprises a plurality of lights arranged along a lower surface of the second layer and configured to project at least one image, color, design, pattern, or combinations thereof, though the second layer.

2. The roof system of claim 1, wherein the decorative layer is applied to the first layer by embedding, embossing, adhering, etching, painting, dyeing, laminating, or printing.

3. The roof system of claim 1, wherein the first layer comprises a sheet or film of polypropylene, polyethylene, polyacrylate, polycarbonate, ethylene-vinyl acetate, silicone, polyvinyl fluoride, polyvinyl chloride, polyurethane, polyvinylidene fluoride, fluorinated ethylene propylene, or combinations thereof.

4. The roof system of claim 1, wherein the decorative layer is integrated with the first layer and further comprises an extruded, woven, textured, embossed or patterned mat, fabric or sheet.

5. The roof system of claim 1, further comprising a waterproof layer positioned along the substrate and over which the first layer and the second layer are received.

6. The roof system of claim 5, further comprising a vapor barrier applied to the substrate.

7. The roof system of claim 1, wherein the protective layer comprises a waterproof membrane, film, sheet, coating, or combination thereof, applied to a bottom surface of the second layer.

8. The roof system of claim 1, wherein the translucent material of the first layer further comprises a fire resistant material, an ultraviolet resistant material, impact resistant material, an antioxidant material, or combinations thereof.

9. A method, comprising:
moving a sheet of translucent polymer material along a processing path;
applying a decorative layer to at least one side surface of the sheet of translucent polymer material, wherein the decorative layer comprises an ultraviolet resistant material including an image, pattern, design, color, picture, textured appearance, or combination thereof;
positioning a plurality of solar cells along the decorative layer;
applying a protective layer to the decorative layer opposite the at least one side surface of the sheet of translucent polymer material; and
forming a plurality of roofing shingles from the sheet of translucent polymer material;
wherein the roofing shingles each include an upper surface comprising a translucent material adapted to be exposed to weather, and wherein the image, pattern, design, color photograph, textured appearance, or combinations thereof of the decorative layer is visible through the upper surface of each shingle.

10. The method of claim 9, wherein applying the decorative layer to the sheet of translucent polymer material comprises printing, painting, laminating, embedding, or embossing the image, pattern, design, color, picture, textured appearance, or combination thereof along the at least one side surface of the sheet of translucent polymer material.

11. The method of claim 9, further comprising positioning a plurality of lights along the decorative layer; wherein the plurality of lights is selectively controllable to create an image, design, picture, video, color, pattern, or combinations thereof, displayed through the upper surface of the sheet of translucent polymer material.

12. A roof system comprising:
a substrate;
a translucent layer configured to be mounted along the substrate, the translucent layer comprising an ultraviolet resistant polymer material;
a decorative layer applied to the translucent layer and including at least one image, design, pattern, picture, textured appearance, color, or combinations thereof;
a protective layer covering the decorative layer; and
a waterproofing layer positioned between the substrate and the translucent layer;
wherein the decorative layer is visible through the translucent layer after the translucent layer is mounted to the substrate;
wherein the decorative layer includes a plurality of lights arranged along the decorative layer, the plurality of lights being selectively controllable to create an image, design, picture, video, color, pattern, or combination thereof, displayed through the translucent layer so as to be visible from an upper surface thereof.

13. The roof system of claim 12, wherein the translucent layer further comprises an extruded, woven, textured, embossed or patterned mat, fabric or sheet.

14. The roof system of claim 12, wherein the translucent layer comprises a sheet or film of polypropylene, polyethylene, polyacrylate, polycarbonate, ethylene-vinyl acetate, silicone, polyvinyl fluoride, polyvinyl chloride, polyurethane, polyvinylidene fluoride, fluorinated ethylene propylene, or combination thereof.

15. The roof system of claim 12, wherein the translucent layer further comprises a fire resistant material, an ultraviolet resistant material, impact resistant material, an antioxidant material, or combination thereof.

16. The roof system of claim 12, further comprising a vapor barrier applied to the substrate and configured to provide transmission of water vapor therethrough.

17. A roof system comprising:
a substrate;
a translucent layer positioned over the substrate, the translucent layer comprising an ultraviolet resistant polymer material and having a decorative features integrated therewith;
wherein the decorative features comprise a color, an image, design, picture, texture, pattern, or combinations thereof, and are visible through the translucent layer; and
a protective layer positioned along a lower surface of the translucent layer, the protective layer comprising a polymer sheet and configured to be removable from the translucent layer;
wherein the decorative features include a plurality of solar cells.

18. The roof system of claim 17, wherein the decorative features comprise one or more particles, chips, dyes or tinting materials mixed with the ultraviolet resistant polymer material of the translucent layer prior to formation of the translucent layer.

19. The roof system of claim 17, further comprising a waterproof layer applied to the substrate and over which the translucent layer is positioned, and a vapor barrier layer positioned below the substrate.

20. The roof system of claim 17, further comprising an adhesive material applied to the lower surface of the translucent layer, and wherein the protective layer is configured to be removable to expose the adhesive material prior to positioning of the translucent layer over the substrate.

21. The roof system of claim 17, wherein the decorative features further comprise a woven or non-woven fabric or mat, chips, particles, textured appearance or combination thereof printed, painted, etched, laminated, adhered, embedded or embossed into the lower surface of the translucent layer.

* * * * *